(12) United States Patent
Cosgrove et al.

(10) Patent No.: US 12,369,732 B2
(45) Date of Patent: Jul. 29, 2025

(54) ADJUSTABLE ADHESIVE ARTICLES WITH PERMISSIBLE MOVEMENT PARALLEL TO BONDING PLANE

(71) Applicant: 3M INNOVATIVE PROPERTIES COMPANY, St. Paul, MN (US)

(72) Inventors: Dylan T. Cosgrove, Oakdale, MN (US); Michael R. Gorman, Woodbury, MN (US); Catherine A. Leatherdale, Woodbury, MN (US); Christina D. Cowman-Eggert, Inver Grove Heights, MN (US); Thomas R. Corrigan, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 503 days.

(21) Appl. No.: 17/418,893

(22) PCT Filed: Jan. 3, 2020

(86) PCT No.: PCT/IB2020/050019
§ 371 (c)(1),
(2) Date: Jun. 28, 2021

(87) PCT Pub. No.: WO2020/141477
PCT Pub. Date: Jul. 9, 2020

(65) Prior Publication Data
US 2022/0110461 A1 Apr. 14, 2022

Related U.S. Application Data

(60) Provisional application No. 62/788,408, filed on Jan. 4, 2019.

(51) Int. Cl.
*A47G 1/16* (2006.01)
*A47G 1/17* (2006.01)
(Continued)

(52) U.S. Cl.
CPC ........... *A47G 1/1613* (2013.01); *A47G 1/175* (2013.01); *C09J 7/203* (2018.01); *C09J 7/38* (2018.01);
(Continued)

(58) Field of Classification Search
CPC ....... A47G 1/1613; A47G 1/175; C09J 7/203; C09J 7/38; C09J 7/403; C09J 2203/366;
(Continued)

(56) References Cited

U.S. PATENT DOCUMENTS

| 3,192,589 A | 7/1965 | Pearson |
| 3,408,705 A | 11/1968 | Kayser |

(Continued)

FOREIGN PATENT DOCUMENTS

| AU | 7658087 | 3/1988 |
| BR | 8101895 | 7/2003 |

(Continued)

OTHER PUBLICATIONS

Encyclopedia of Polymer Science and Engineering: Poly(phenylene Ether) to Radical Polymerization, Wiley-Interscience Publishers, New York, vol. 13, 1988, 3 pages.

(Continued)

*Primary Examiner* — Patricia L. Nordmeyer

(57) ABSTRACT

The present disclosure provides adhesive mounting articles that permit sliding movement along a primary path, even while the article is fixed between a mounting object and a mounting surface. The adhesive articles can allow user precise control over the location and orientation of his or her mounting object, particularly frames.

18 Claims, 14 Drawing Sheets

(51) Int. Cl.
  *C09J 7/20* (2018.01)
  *C09J 7/38* (2018.01)
  *C09J 7/40* (2018.01)

(52) U.S. Cl.
  CPC ......... *C09J 7/403* (2018.01); *C09J 2203/366* (2020.08); *C09J 2203/37* (2020.08); *C09J 2301/124* (2020.08); *C09J 2301/308* (2020.08)

(58) Field of Classification Search
  CPC .............. C09J 2203/37; C09J 2301/124; C09J 2301/308; C09J 7/20; C09J 2301/302; C09J 2400/243; C09J 7/40; C09J 2203/00; C09J 2301/122; B32B 3/06; B32B 7/06; B32B 7/12; B32B 2250/03; B32B 2250/04; B32B 2307/51; B32B 2307/54; B32B 2307/542; B32B 2307/748; B32B 2405/00
  See application file for complete search history.

(56) References Cited

U.S. PATENT DOCUMENTS

| | | | |
|---|---|---|---|
| 3,808,648 | A | 5/1974 | Billarant |
| 4,290,174 | A | 9/1981 | Kalleberg |
| 4,322,875 | A | 4/1982 | Brown |
| 4,472,480 | A | 9/1984 | Olson |
| 4,736,048 | A | 4/1988 | Brown |
| 4,775,310 | A | 10/1988 | Fischer |
| 4,824,261 | A | 4/1989 | Provost |
| 4,854,017 | A | 8/1989 | Kamp |
| 4,894,060 | A | 1/1990 | Nestegard |
| 4,955,981 | A | 9/1990 | Provost |
| 4,980,443 | A | 12/1990 | Kendziorski |
| 5,040,275 | A | 8/1991 | Eckhardt |
| 5,077,870 | A | 1/1992 | Melbye |
| 5,113,555 | A | 5/1992 | Wilson |
| 5,119,531 | A | 6/1992 | Berger |
| 5,212,853 | A | 5/1993 | Kaneko |
| 5,396,687 | A | 3/1995 | Osterman |
| 5,403,094 | A | 4/1995 | Tomic |
| 5,409,189 | A | 4/1995 | Luehmann |
| 5,507,464 | A | 4/1996 | Hamerski |
| 5,516,581 | A | 5/1996 | Kreckel |
| 5,586,372 | A | 12/1996 | Eguchi |
| 5,625,929 | A | 5/1997 | Hattori |
| 5,951,453 | A | 9/1999 | Yeager |
| 5,967,474 | A | 10/1999 | doCanto |
| 5,989,708 | A | 11/1999 | Kreckel |
| 6,000,106 | A | 12/1999 | Kampfer |
| 6,004,032 | A | 12/1999 | Kapperman |
| 6,076,238 | A | 6/2000 | Arsenault |
| 6,082,686 | A | 7/2000 | Schumann |
| 6,106,922 | A | 8/2000 | Cejka |
| 6,131,864 | A | 10/2000 | Schumann |
| 6,132,660 | A | 10/2000 | Kampfer |
| 6,190,594 | B1 | 2/2001 | Gorman |
| 6,231,962 | B1 | 5/2001 | Bries |
| 6,287,665 | B1 | 9/2001 | Hammer |
| 6,395,389 | B1 | 5/2002 | Luehmann |
| 6,403,206 | B1 | 6/2002 | Bries |
| 6,569,521 | B1 | 5/2003 | Sheridan |
| 6,572,945 | B2 | 6/2003 | Bries |
| 6,592,800 | B1 | 7/2003 | Levitt |
| 6,627,133 | B1 | 9/2003 | Tuma |
| 6,811,126 | B2 | 11/2004 | Johansson |
| 6,835,452 | B1 | 12/2004 | Hamerski |
| 6,972,141 | B1 | 12/2005 | Bries |
| 7,028,958 | B2 | 4/2006 | Pitzen |
| 7,078,093 | B2 | 7/2006 | Sheridan |
| 7,198,743 | B2 | 4/2007 | Tuma |
| 7,214,334 | B2 | 5/2007 | Jens |
| 7,467,873 | B2 | 12/2008 | Clarke |
| 7,781,056 | B2 | 8/2010 | Bries |
| 7,897,078 | B2 | 3/2011 | Petersen |
| D665,653 | S | 8/2012 | Thompson |
| 8,398,306 | B2 | 3/2013 | Kinigakis |
| 8,641,278 | B2 | 2/2014 | Ducauchuis |
| 8,708,305 | B2 | 4/2014 | McGreevy |
| 2002/0069495 | A1 | 6/2002 | Murasaki |
| 2003/0019780 | A1 | 1/2003 | Parodi |
| 2005/0157959 | A1 | 7/2005 | Johnson |
| 2008/0131035 | A1 | 6/2008 | Rogers |
| 2011/0143133 | A1 | 6/2011 | Kinigakis |
| 2011/0249919 | A1 | 10/2011 | Shepard |
| 2012/0006822 | A1 | 1/2012 | Yeager |
| 2012/0011685 | A1 | 1/2012 | Rocha |
| 2012/0046151 | A1 | 2/2012 | Yeager |
| 2012/0151722 | A1 | 6/2012 | Hertlein |
| 2013/0071047 | A1 | 3/2013 | VanLoocke |
| 2014/0283342 | A1 | 9/2014 | Adams |
| 2015/0010252 | A1 | 1/2015 | Yeager |
| 2016/0067937 | A1 | 3/2016 | Yeager |
| 2016/0068722 | A1 | 3/2016 | Schmitz-Stapela |

FOREIGN PATENT DOCUMENTS

| | | | |
|---|---|---|---|
| BR | PI0604504 | 8/2007 | |
| CA | 2026736 | 4/1991 | |
| CA | 2551513 | 1/2007 | |
| CA | 2813582 | 4/2012 | |
| CA | 2927744 | 7/2019 | |
| CN | 204323921 | 5/2015 | |
| DE | 2159353 | 6/1973 | |
| DE | 3331016 | 10/1984 | |
| DE | 202014102922 | 11/2014 | |
| EG | 23202 | 7/2002 | |
| EP | 0793923 | 9/1997 | |
| FR | 2627818 | 9/1989 | |
| FR | 2917275 | 12/2008 | |
| IL | 109038 | 5/1996 | |
| JP | H08-275807 | 10/1996 | |
| WO | WO 1987-002646 | 5/1987 | |
| WO | WO 1994-009279 | 4/1994 | |
| WO | WO-9937729 A1 * | 7/1999 | ............ A47G 1/175 |
| WO | WO 2009-006614 | 1/2009 | |
| WO | WO 2010-030412 | 3/2010 | |
| WO | WO 2011-146658 | 11/2011 | |
| WO | WO 2015-195344 | 12/2015 | |
| WO | WO 2015-195616 | 12/2015 | |
| WO | WO 2016-196736 | 12/2016 | |
| WO | WO 2017-136188 | 8/2017 | |
| WO | WO 2017-136189 | 8/2017 | |
| WO | WO 2017-136219 | 8/2017 | |
| WO | WO 2017-136279 | 8/2017 | |
| WO | WO 2017-136432 | 8/2017 | |
| WO | WO 2018-039584 | 3/2018 | |
| WO | WO 2019-005831 | 1/2019 | |
| WO | WO 2019-102430 | 5/2019 | |

OTHER PUBLICATIONS

Encyclopedia of Polymer Science and Technology, Plastics, Resins, Rubbers, Fibers Wiley-Interscience Publishers, New York, vol. 1, 1964, 24 pages.

International Search Report for PCT International Application No. PCT/IB2019/050019, mailed on Mar. 31, 2020, 4 pages.

* cited by examiner

ADJUSTABLE ADHESIVE ARTICLES WITH PERMISSIBLE MOVEMENT PARALLEL TO BONDING PLANE

CROSS REFERENCE TO RELATED APPLICATIONS

This application is a national stage filing under 35 U.S.C. 371 of PCT/IB2020/050019, filed 3 Jan. 2020, which claims the benefit of U.S. Provisional Application No. 62/788,408, filed 4 Jan. 2019, the disclosures of which are incorporated by reference in their entireties herein.

BACKGROUND

The revolutionary Command® Adhesive Strip products are a line of stretch releasable adhesive strips that holds strongly on a variety of surfaces (including paint, wood, and tile) and that remove cleanly—no holes, marks, or sticky residue. In general, these products include a stretch release pressure sensitive adhesive composition disposed on tape or other backings and generally have utility in bonding to various surfaces or substrates for numerous applications. Stretch-release products are designed to firmly adhere an article, such as a hook (to hold a picture or an article of clothing) or other decorative or utilitarian element, to a surface (an adherend), yet remove cleanly when pulled away from the surface at a low angle. The clean removal aspect is so that a tacky and/or unsightly residue is not left behind on the surface after removal of the stretch release adhesive. During the process of stretch release removal, the adhesive layer preferably remains adhered to the tape backing as the backing is stretched, but releases from the surface (adherend).

Articles that can be removed from a surface by stretching are known in the patent prior art. U.S. Pat. No. 5,516,581 (Kreckel et al.) discloses a removable adhesive tape having a highly extensible and substantially inelastic backing coated with a layer of pressure sensitive adhesive. U.S. Pat. No. 6,231,962 (Bries et al.) discloses conformable pressure-sensitive adhesive tapes which comprise a layer of polymeric foam in the backing and may be adhered firmly to a substrate and thereafter removed therefrom by stretching at an angle no greater than about 35° from the surface of the substrate. U.S. Pat. No. 7,078,093 (Sheridan et al.) discloses a stretch releasing pressure sensitive adhesive tape including a silicone pressure sensitive adhesive composition that exhibits a 180° peel strength on a glass substrate at 98% relative humidity of at least about 5.47 N/dm, and a non-tacky tab. U.S. Pat. No. 6,395,389 (Lühmann et al.) discloses an adhesive tape strip for a re-releasable adhesive bond, which can be removed from a bonded joint by pulling in the direction of the bond plane, having a non-adhesive grip tab and a subsequent, elongate strip which is adhesive on one or both sides.

One particularly useful stretch releasable adhesive article can be found in U.S. Pat. No. 6,572,945 (Bries et al.), which provides two stretch releasable adhesive tape constructions joined by a separable connection. The separable connection possesses the ability to be connected, disconnected and reconnected without destruction of an adhesive tape construction and/or the bonding substrate. Objects bonded with such adhesive article can be positionally adjusted with respect to one another. For example, the vertical, horizontal or angular position of the picture frame can be adjusted relative to the substrate by disconnecting and reconnecting the separable connection at new locations.

SUMMARY

The inventors of the present disclosure recognized that the existing mounting products suffered from various disadvantages. Existing mounting products seldom allow for a user to adjust location or orientation, even slightly, once the exposed adhesive is placed in contact with the desired mounting surface. The adhesives commonly used in these products, particularly those designed for damage free, stretch release removal, demonstrate high initial tack or "quick stick" behavior, resulting in a rapid setting bond with the wall or other mounting surface Although several methods and configurations have been developed to make application of mounting articles easier, no solution to date provides for mounting articles capable of forming strong bonds that have a combination of rapid bonding when pressed in place and retention of high shear strength allowing for damage free mounting of larger articles, and permissible adjustment while bonded to an adherend.

The inventors of the present disclosure sought to formulate mounting products and/or adhesive articles that combine an ability to initially adjust the position of an adhesive article with an acceptable shear strength suitable for holding large or heavy objects, all while avoiding damage to the mounting surface during initial application, positioning, use, and removal.

In accordance with the present disclosure, an adhesive article is provided that includes a separable connection capable of sliding movement along at least one primary, linear path while the separable connection is connected (e.g., closed). The adhesive articles of the present disclosure feature moveable elements, such as cooperating rail segments, well suited to modifying the orientation of an object mounted to a surface, whereby the article can be initially positioned by securing an adhesive layer to a wall surface without absolute certainty required for its initial position. Under certain conditions, the article may even be removed from the wall and placed at a new location. Once the location is selected, the movability afforded by the separable connection system allows for minor adjustments to the orientation and location of the object on the wall surface. Thus, a removable adhesive article is provided which can move freely on set paths relative to the desired mounting surface, and which does not have to be disassembled or removed from the wall surface to effectuate a change in location or orientation.

In one aspect, the present disclosure provides an adhesive article comprising a first adhesive construction having a first major surface and a second major surface, with the first major surface defining a bond plane; a second adhesive construction having a first major surface and a second major surface; a separable connection coupling to the second major surface of the first adhesive construction and the first major surface of the second adhesive construction, such that the separable connection is disposed between the first and second adhesive constructions, wherein the first adhesive construction is moveable along a primary path relative to the second adhesive construction at the separable connection in a plane substantially parallel to the bond plane.

In another aspect, each of the first and second separable connector components comprise, a backing having a length, a width, and a thickness; and rows of rail segments protruding perpendicularly from the backing, wherein each of the rail segments has a base portion attached to the backing and a cap portion distal from the backing, wherein the cap portion has a cap width that is greater than a width of the base portion, wherein the cap portion overhangs the base portion on opposing sides, and wherein the base portion has a length that is greater than the width of the base portion.

In yet another aspect, the present disclosure provides a frame assembly comprising: a frame body having a front surface, a back surface, and a center axis; a first adhesive article affixed to the back surface adjacent a first side of the frame body, the first adhesive article oriented at about a first acute angle relative to the center axis; a second adhesive article affixed to the back surface adjacent an second, opposing side of the frame body, the second adhesive article oriented at about a second acute angle relative to center axis; wherein each of the first and second adhesive articles include, a first adhesive construction having a first major surface and a second major surface, with the first major surface defining a bond plane; a second adhesive construction having a first major surface and a second major surface; a separable connector coupling the second major surface of the first adhesive construction and the first major surface of the second adhesive construction, such that the separable connector is disposed between the first and second adhesive constructions, wherein the first adhesive construction is moveable relative to the second adhesive construction in a plane substantially parallel to the bond plane.

As used herein, the term "alternating" as used herein refers to one row of rail segments being disposed between any two adjacent rows of posts (i.e., the rows of posts have only one row of rail segments between them) and one row of posts being disposed between any two adjacent rows of rail segments.

As used herein, the term "perpendicular" as used herein to refer to the relationship between the backing and the rail segments and/or posts includes substantially perpendicular. "Substantially perpendicular" means that the planes defined by the backing and a row of rail segments or posts can deviate from perpendicular by up to 10 (in some embodiments, up to 7.5 or 5) degrees.

As used herein, "tack" means the instant contact adhesion between the adhesive and the substrate.

As used herein "geometry" refers to the size and shape of an element.

As used herein, "layer" means a single stratum that may be continuous or discontinuous over a surface.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As recited herein, all numbers should be considered modified by the term "about".

As used herein, "a", "an", "the", "at least one", and "one or more" are used interchangeably. Thus, for example, an adhesive article comprising "an" adhesive layer can be interpreted as an article comprising "one or more" adhesive layers.

Also herein, the recitations of numerical ranges by endpoints include all numbers subsumed within that range (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

BRIEF DESCRIPTION OF THE DRAWINGS

The disclosure will be further described with reference to the drawings, wherein corresponding reference characters indicate corresponding parts throughout the several views, and wherein.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

The adhesive article embodiments exemplified herein provide excellent adhesion and shear holding power during use as well as damage-free removal from the wall, surface, or substrate to which the adhesive article is adhered, mounted, or attached. The stretch releasable articles herein can include a single or multilayer construction that can be removed from a substrate or surface by stretching it at an angle of less than 35°.

The present disclosure generally relates to adhesive articles that can be removed from a substrate without damage. As used herein, the terms "without damage" and "damage-free" or the like means the adhesive article can be separated from the substrate without causing visible damage to paints, coatings, resins, coverings, or the underlying substrate and/or leaving behind residue. Visible damage to the substrates can be in the form of, for example, scratching, tearing, delaminating, breaking, crumbling, straining, and the like to any layers of the substrate. Visible damage can also be discoloration, weakening, changes in gloss, changes in haze, or other changes in appearance of the substrate.

Figure 1:
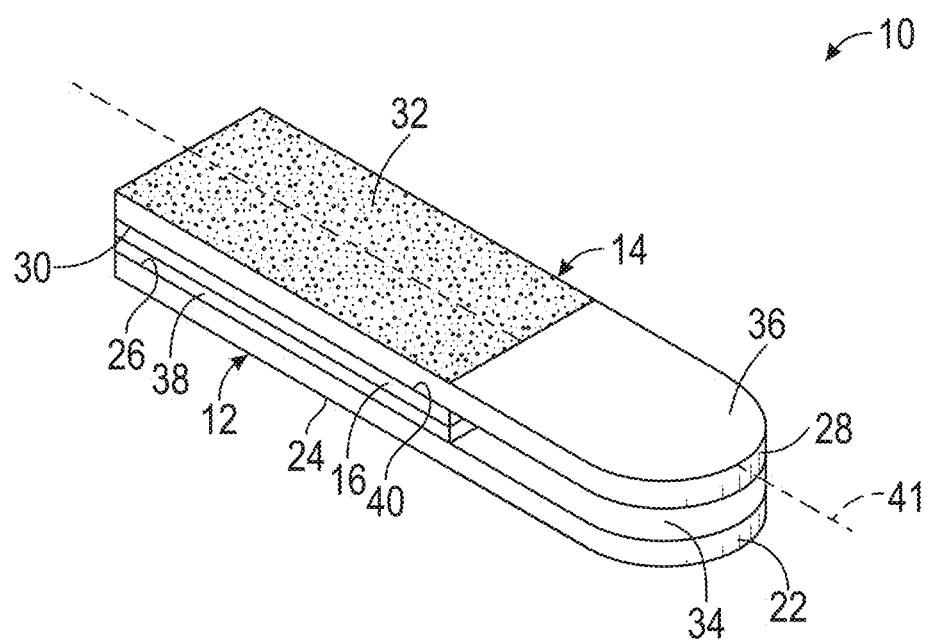
FIG. 1 illustrates a perspective view of an adhesive article including two adhesive constructions combined by a separable connection system.
Figure 3:
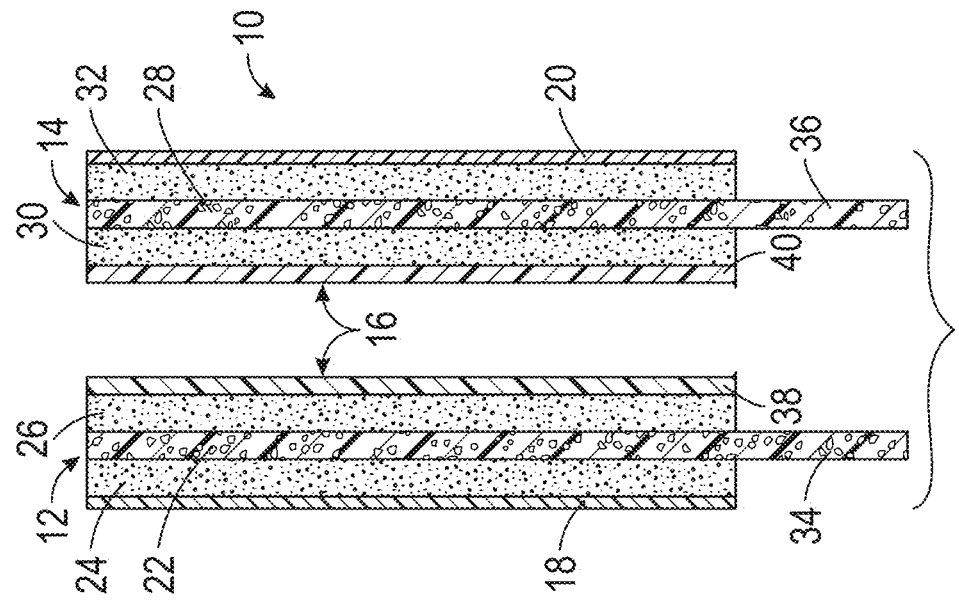
FIG. 3 is an enlarged side view in cross section of the adhesive tape construction of FIG. 1, wherein the adhesive constructions are illustrated separated from one another at the separable connection system.
Figure 2:
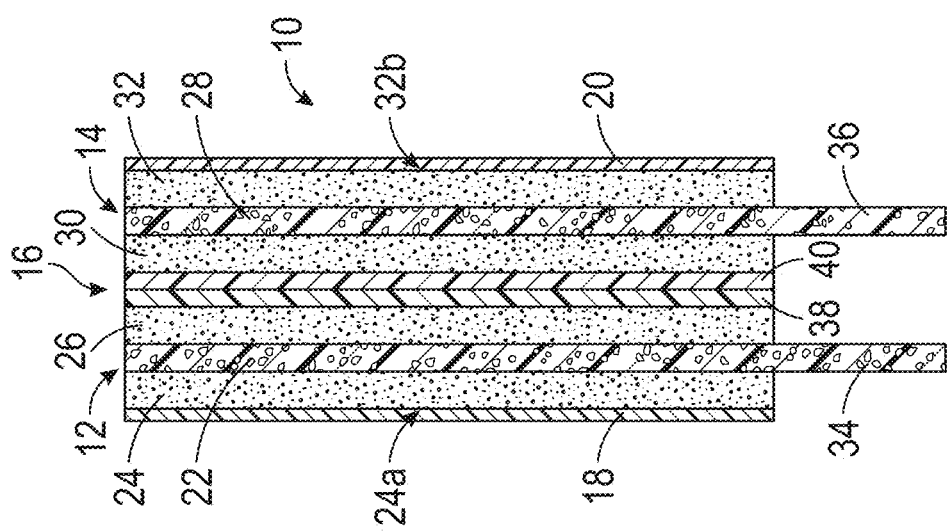
FIG. 2 is an enlarged side view in cross section of the adhesive article of FIG. 1, wherein the adhesive constructions are illustrated connected to one another at the separable connection system.

An adhesive article featuring a slidable, separable connection is depicted in FIGS. 1, 2 and 3. Adhesive article 10 includes a first adhesive construction 12 and a second adhesive construction 14. The first adhesive construction 12 comprises a backing layer 22 and adhesive layers 24 and 26 of the same or different adhesive compositions on opposite major surfaces of the backing layer 22. Second adhesive construction 14 likewise comprises a backing layer 28 and adhesive layers 30 and 32 of the same or different adhesive compositions on opposite major surfaces of the backing layer 28. Each adhesive layer 24, 26, 30, and 32 may be single layer or multilayer. Each backing 22, 28 may likewise be single layer or multilayer. Adhesive layers can be the same as one another or disparate from one another. Disparate, in this context, is used to describe substantial differences in composition or adhesive performance. Adhesive layers 24, 26, 30, and 32 can each be continuous or discontinuous (e.g., patterned) across the major surfaces of the requisite backing.

The external surfaces of the adhesive layers 24 and 32 of the first and second adhesive constructions 12 and 14 can be used to affix the adhesive article to the desired adherend, hardgood, and/or mounting object (e.g., a picture frame). For instance, the first major surface 24a of the adhesive layer 24 provides an available adhesive region for securing the first adhesive construction 12 to the desired mounting object, while the second major surface 32b of the adhesive layer 32 provides an available adhesive region for securing the second adhesive construction 14 to the desired mounting adherend. One or both of the available adhesive regions on major surface 24a and 32b may be covered by a release liner (18, 20, respectively), as described in further detail below.

The first and second adhesive constructions 12, 14 may include a backing as depicted or may be backing free. Backing-free (i.e., carrier free) adhesive constructions are described, for example, in US Publication No. 2016/0068722 (Schmitz-Stapela et al.). As an alternative to a backing-borne adhesive construction, a backing-free or solid adhesive can be used instead of the combination of a backing with adhesive layers in either or both the first and second adhesive constructions 12, 14. A backing-free adhesive construction may itself comprise a plurality of adhesive materials provided as sublayers or mixtures or otherwise and may be provided in a way so that one adhesive surface is the same or different than its other adhesive surface. For example, two different adhesive compositions can be co-extruded so as to provide an adhesive construction comprising two different sublayers, one forming a first adhesive surface of a first expected adhesion to substrate and the other forming a second adhesive surface of a second expected adhesion. The expected adhesions may be the same or different, allowing one, for example, to be at least semi-permanent and the other to be removable without damage.

Furthermore, each of the first and second adhesive tape constructions 12 and 14 may include a tab 34 and 36, respectively. Tabs 34 and 36 facilitate the stretch release of each adhesive tape structure 12 and 14, respectively, in embodiments where the adhesive construction is stretch releasable. Tab 34 can be provided as an extension of the backing layer 12. That is, the backing layer 22 extends farther longitudinally than the adhesive layers 24 or 26. Likewise, the tab 36 comprises an extension of the backing layer 28 that extends farther longitudinally than the adhesive layers 30 and 32. The adhesive layers 24, 26, 30 and 32 each cover a similar area of the backing layers 22 and 28, respectively.

The adhesive article 10 includes a separable connection system 16 between the first and second adhesive constructions 12, 14. The separable connection system 16 includes a first connector member 38 disposed on the second major surface of the first adhesive construction 12, and a second connector member 40 disposed on the second major surface of second adhesive construction 14. The first and second separable connector members 38 and 40 are engageable with each other to form a separable connection, thereby detachably connecting the adhesive constructions 12, 14: the first connector member 38 remains with the first adhesive construction 12 and the second connector member 40 remains with the second construction 14 after separation of the separable connection 16 (See FIG. 3). Certain advantages of the articles are based upon the incorporation of a separable connection 16 between the first and second adhesive constructions 12 and 14, as a mounting object can be separated from a mounting surface without destruction of either adhesive construction 12 or 14. Moreover, that means that the mounting object can also be reconnected to the adherend by way of the same adhesive constructions 12 and 14. The first and second connector members 38 and 40 are typically co-extensive with and cover the similar areas as the adhesive layers 24, 26, 30 and 32. In other embodiments explored in more detail below (e.g., FIG. 16), one of the first and second adhesive constructions 12, 14 may be larger than the corresponding construction and possess a resultant larger separable connector member surface area. The difference in first and second dimensions can allow the smaller construction to be placed at and moved from multiple locations on the larger separable connector surface.

Any suitable technique or techniques may be utilized by the user to suitably reconnect the first and second separable connecting members 38, 40.

The separable connection 16 can include any known or developed reusable connector for connecting the adhesive constructions 12, 14. The separable connection 16 permits the separation and connection of the first and second adhesive constructions 12, 14 along a general plane. In some embodiments, the separable connection 16 can include, for example, a mechanical type fastener including an interlocking system, an intermeshing system having connection without macroscopic mechanical deformation or interference, a releasable contact responsive fastener, a splittable construction, and the like. In other embodiments, the separable connector 16 includes one or more layers of an adhesive, gel, or gel adhesive bound by covalent bonding, ionic bonding, hydrogen bonding, and/or van der Waals forces.

In some embodiments, the first separable connecting member 38 can include a layer of hook material, and the second separable connecting member 40 can include a layer of loop material which is bonded with the second adhesive layer 30 at a second major surface thereof. It is contemplated that any commercially available hook and loop connector system, including those available from 3M Company, can be utilized. Hook and loop connector systems are but one type of mechanical interlocking connector systems which are suggested by this embodiment. By mechanical interlocking, it is meant those fasteners where at least one of the connector elements undergoes some macroscopic deformation (preferably plastic deformation) so that a mechanical interference results between plural components. Many different modifications of the inter-engaging elements are designed based on the requisite force and manner of separation between the cooperating layers of such a separable connector system. Some exemplary separable connectors are described in, for example, U.S. Pat. No. 7,781,056 (Bries et al.); 6,403,206 (Bries et al.); and 6,972,141 (Bries et al.), all of which are incorporated by reference in their entirety herein.

The separable connecting members 38, 40 can be connected to adhesive constructions 12, 14 using any suitable technique or techniques. In one or more embodiments, separable connecting members 38, 40 are adhered to the requisite adhesive construction using any suitable adhesive or combination of adhesives, including any of the hot melt adhesives described further herein. Further, in one or more embodiments, separable connecting members 38, 40 can be ultrasonically bonded to the requisite adhesive construction 12, 14. In one or more embodiments, the separable connecting members 38, 40 can be mechanically attached to the requisite adhesive construction using any suitable technique or techniques. In one or more embodiments, a tie layer as described herein in any of its embodiments may be disposed between one or both of the first and second connecting members 38, 40 and the first and second adhesive construction 12, 14, respectively.

Figure 4A:
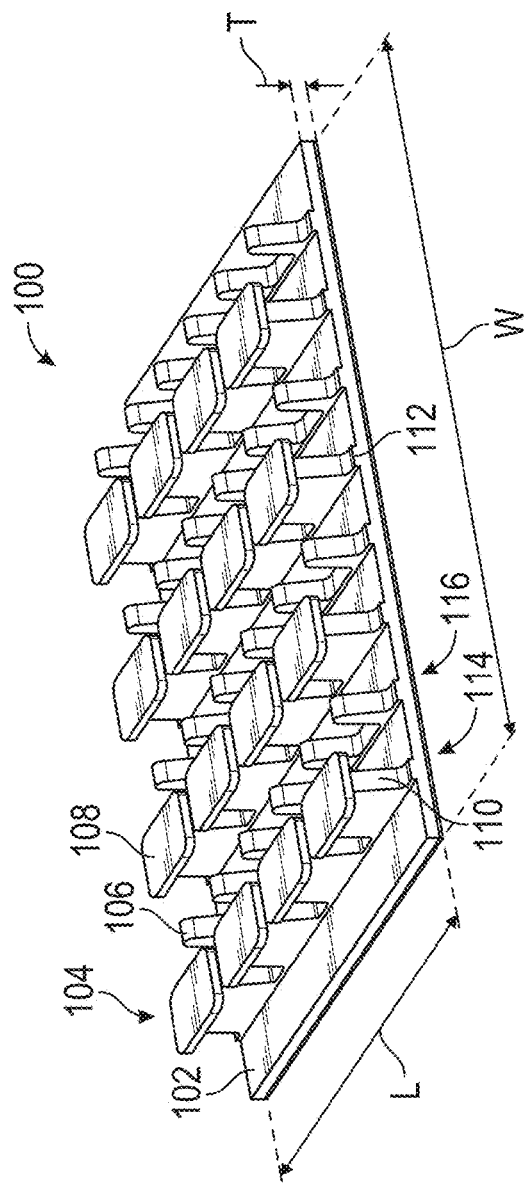
FIG. 4A is a schematic perspective view of an embodiment of a fastener of the present disclosure.
Figure 4B:
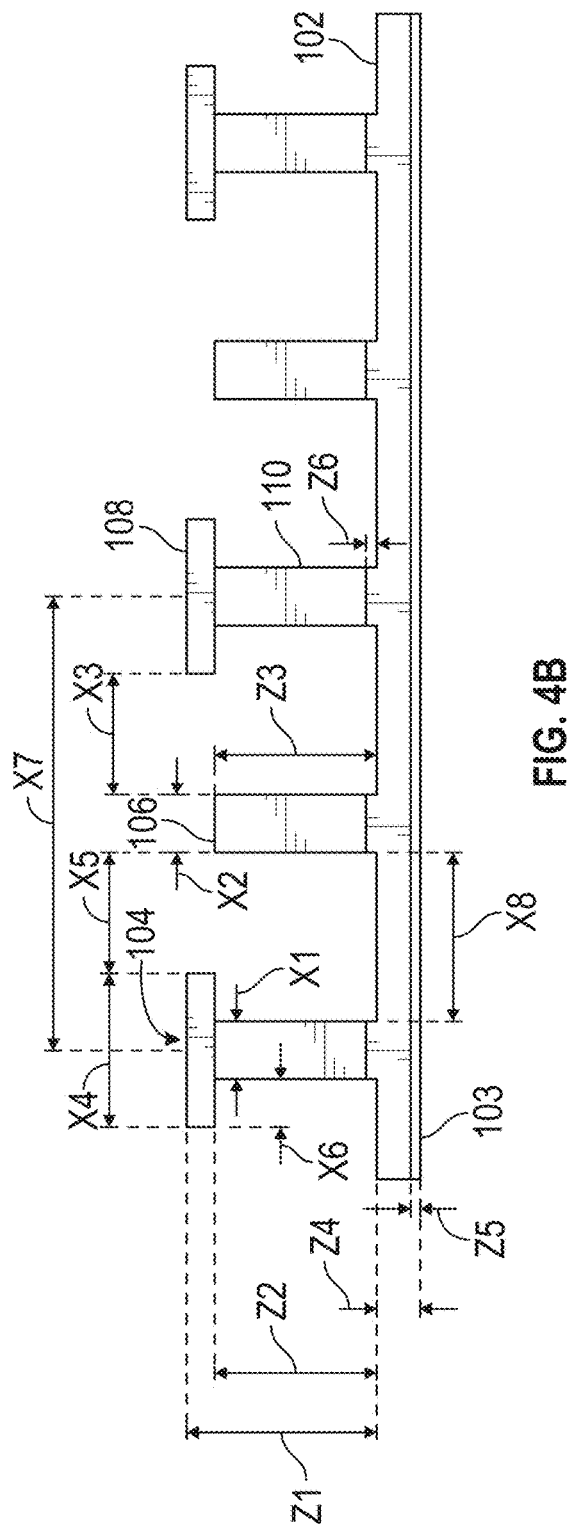
FIG. 4B is a schematic side view of the fastener of FIG. 4A.
Figure 4C:
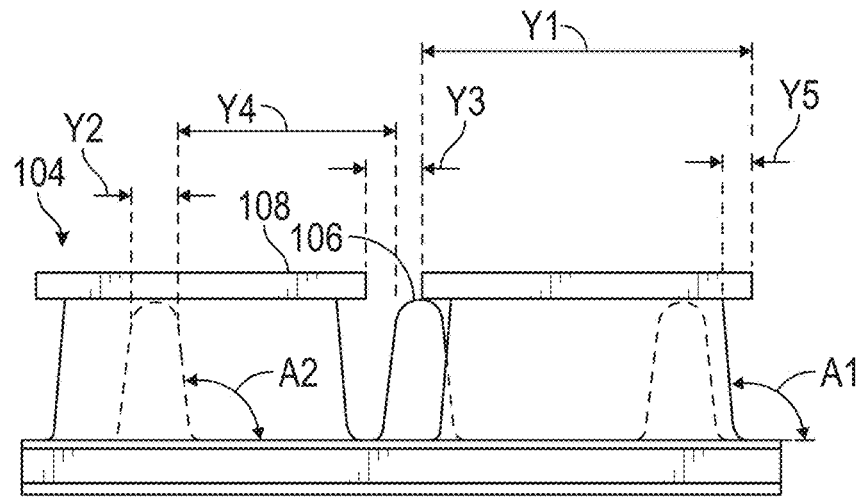
FIG. 4C is a schematic side view of the fastener of FIG. 4A, which side view is orthogonal to the side view shown in FIG. 4B.

In presently preferred embodiments, each of the separable connecting members 38, 40 include a slidable fastener, including those slidable fasteners as depicted in FIGS. 4A, 4B, and 4C. In such embodiments, when the first and second fastener members 38, 40 are fastened, they can slide relative to each other in a direction parallel to the length of the adhesive article 10. This may be advantageous, for example, if the positioning of the first and second fastener members relative to each is not desirable when the first and second fastener members are initially fastened. To achieve a desirable positioning the first and second fastener members can be slid into place. This is also particularly advantageous for post-placements adjustments to the orientation of the mounting article, such as rotations about an axis.

In some embodiments, the first separable connecting member 38 and second separable connecting member 40 are each slidable relative to one another. In other embodiments, only the first separable connecting member is slidable relative to the second, and vice versa. The connection between the adhesive constructions 12, 14 and the separable connecting members 38, 40, respectively, results in the first and second adhesive constructions 12, 14 themselves being slidable relative to one another in at least one principle direction (i.e., the principal or primary path)

In some embodiments, the first and second separable connectors are slidable along at least one linear path that is substantially parallel to the extension of rows of rail segments and/or posts on the slidable fastener. In other embodiments, the first and second separable connectors are slidable along a principal linear path, with a minor, fixed translational degree of freedom possible in directions generally orthogonal to the principle path: that is, a first path that is substantially parallel to the extension of rows of fastening elements (e.g., rails and/or posts); and a second path that is generally orthogonal to the first path. In such embodiments, the fastener is said to be slidable in two dimensions, however, the length of sliding is typically orders of magnitude greater in the primary path.

The first adhesive construction 12 can be slidable across all or a portion of the length or width (depending on orientation of the fastener) of the second separable connecting member 40. In presently preferred implementations, the first adhesive construction is slidable over at least 15% of the second separable connecting member length. In other embodiments, the first adhesive construction is slidable over at least 25%, at least 30%, at least 40%, at least 50%, at least 60%, or at least 75% of the length of the second separable connecting member 40. In certain circumstances, it can be advantageous to allow for sliding capability across a majority of the length or more, as such sliding can allow for greater degree of adjustments to a mounting object. In other circumstances, it may be advantageous to limit movement beyond a certain threshold to ensure, for example, that sufficient dynamic shear strength is maintained within the separable connection 16.

The same considerations may apply, mutatis mutandis, to the second adhesive construction 14 and the first separable connecting member 38.

A slidable fastener 100 particularly well suited for use in the adhesive articles of the present disclosure is depicted in FIGS. 4A-FIG. 7 and includes a fastener backing 102 having a length (l), a width (w), and a thickness (t). The fastener 100 includes rows 114 of rail segments 104. In the embodiment illustrated in FIGS. 4A, 4B, and 4C, the rail segments 104 protrude perpendicularly from the fastener backing 102. Each of the rail segments 104 has a base portion 110 attached to the backing 102 and a cap portion 108 distal from the backing 102. The cap portion 108 has a cap width X4 that is greater than the width X1 of the base portion 110, and the cap portion 108 overhangs the base portion 110 on opposing sides. The ratio of the cap width X4 to the width X1 of the base portion 110 is typically at least 1.25:1, 1.5:1, or 2:1 and can be up to 3:1, 4:1, or 5:1. FIG. 4B illustrates the cap overhang distance X6. In some embodiments, the cap portion 108 overhangs the base portion 10 on all sides of base portion 110. FIG. 4C illustrates the cap overhang distance Y5, in the direction parallel to the length (l) of the fastener 1. Caps also have a cap thickness, which, if the cap is not rectilinear, is measured as a distance between a line tangent to the highest point on the cap above the backing and a line tangent to lowest point on the cap above the backing. For example, in the embodiment shown in FIG. 4B, the cap thickness is Z1 minus Z2. From the term "rows of rail segments", it should be understood that each row 114 includes more than one rail segment 104. The fastener 100 does not include a continuous rail; instead the rail segments 104 are separated from each other on the backing 102. For example, the caps 108 of the rail segments 104 in a row 114 are separated by cap-to-cap distance Y3 in the direction parallel to the length (l) of the fastener 1.

The base portion 110 of the rail segment 104 has a length Y1 that is greater than the width X1 of the base portion 110. In some embodiments, the ratio of the length Y1 to the width X1 of the base portion 110 is at least about 1.5:1, 2:1, 3:1, 4:1, or 5:1, 10:1, or 15:1. The base portion 110 of the rail segment 104 may have a variety of cross-section shapes. For example, the cross-sectional shape of the base portion 110 may be a polygon (e.g., rectangle, hexagon, or octagon), or the cross-sectional shape of the base portion 10 may be curved (e.g., elliptical). The base portion 110 may taper from its base to its distal end. In this case and in the case of curved base portions, the ratio of the length Y1 to the width X1 of the base portion 110 is measured from the longest and the widest point. As shown in FIG. 4B the length Y1 of the base portion at its longest point is about the same as the length of the cap portion.

For embodiments such as the embodiment illustrated in FIG. 4C, base portions 110 that taper from their bases to their distal ends have a sloping face and a taper angle A1 between the sloping face and the fastener backing 102. In some embodiments, the taper angle A1 between the sloping face of the base portion 110 and the backing 102 is in a range from 91 degrees to 130 degrees, in some embodiments, in a range from 91 degrees to 125 degrees, 95 degrees to 120 degrees, 95 degrees to 115 degrees, 95 degrees to 110 degrees, 93 degrees to 105 degrees, or 95 degrees to 100 degrees.

In some embodiments, the rail segments 104 have a maximum height Z1 (above the backing 2) of up to 3 millimeter (mm), 1.5 mm, or 1 mm and, in some embodiments, a minimum height of at least 0.1 mm or 0.2 mm. The height Z1 of the rail segments 4 can be in a range from 0.3 mm to 0.7 mm, 0.3 mm to 0.6 mm, or 0.35 mm to 0.55 mm. The thickness Z7 of the cap portion 8 of rail segments 4 can be in a range from 0.03 mm to 0.3 mm, 0.04 mm to 0.15 mm, or 0.04 mm to 0.1 mm. In some embodiments, the base portions 10 of the rail segments 4 have a maximum width X1 of up to about 0.5 mm, 0.4 mm, 0.3 mm, or 0.2 mm and a minimum width of at least 0.05 mm, 0.1 mm, or 0.125 mm. Some useful widths X1 of the base portions 10 are in a range from 0.05 mm to 0.5 mm, 0.1 mm to 0.2 mm, or 0.125 mm to 0.175 mm. Some useful cap widths X4 of the rail segments 104 are in a range from 0.1 mm to 1.0 mm, 0.3 mm to 0.5 mm, 0.3 mm to 0.45 mm, or 0.3 mm to 0.4 mm. Some useful cap overhang distances X6 of the rail segments 104 are in a range from 0.025 mm to 0.4 mm, 0.05 mm to 0.3 mm, or 0.1 m to 0.25 mm. In some embodiments, the rail segments 104 have a maximum length Y1 of up to about 1.5 mm (in some embodiments, up to 1.25, 1.0, 0.9, or 0.8) mm and a minimum length Y1 of at least about 0.1 mm, 0.2 mm, 0.4 mm, or 0.5 mm. The length Y1 of the rail segments 104 can be in a range from 0.1 mm to 1.5 mm, 0.2 mm to 1.0 mm, or 0.600 mm to 0.800 mm. Some useful cap overhang distances Y5 of the rail segments 104 in the length direction are in a range from 0.025 mm to 0.2 mm, 0.025 mm to 0.1 mm, or 0.04 mm to 0.075 mm. In some embodiments, the cap-to-cap distance Y3 in the direction parallel to the length (l) of the fastener 100 is up to about 0.5 mm, 0.4 mm, 0.3 mm, or 0.25 mm and at least about 0.05 mm, 0.1 mm, or 0.125 mm. Some useful cap-to-cap distances Y3 are in a range from 0.05 mm to 0.5 mm, 0.1 mm to 0.3 mm, or 0.125 mm to 0.225 mm.

The slidable fasteners useful in the present disclosure may also comprise rows of posts. In the embodiment illustrated in FIGS. 4A, 4B, and 4C, the fastener 100 includes rows 116 of posts 106 protruding perpendicularly from the fastener backing 102. In some embodiments, the rows 114 of rail segments 104 and rows 116 of posts 106 alternate. The fastener 100 can have at least 2, 3, 5, or 10 of the rows 114 of rail segments 104 alternating with at least 2, 3, 5, or 10 of the rows 116 of posts 106. From the term "rows of posts", it should be understood that each row 116 includes more than one post 106. The fastener 100 does not include a continuous ridge; instead the posts 106 are separated from each other on the backing 102. For example, the posts 106 in a row 116 are separated by a distance Y4 in the direction parallel to the length (l) of the fastener 100. In general, the posts 106 have a length that is different from the length of the rail segments 104. In the embodiment illustrated in FIGS. 4A, 4B, and 4C, the length Y1 of the base portion 110 of the rail segments 104 is greater than the length Y2 of the post 106, and the number of posts 106 in one of the rows 116 of posts is more than the number of rail segments 104 in one of the rows of rail segments 114. The length Y1 of the base portion 110 of the rail segments 104 can be at least two, three, or four times the length Y2 of the posts 106. The number of posts 106 in one of the rows 116 of posts can be at least 1.5, 2, or 3 times the number of rail segments 104 in one of the rows of rail segments 114. Since the fastener 1 is useful as a self-mating fastener, the posts generally have a height that is no greater than a height of the rail segments. In the embodiment illustrated in FIGS. 4A, 4B, and 4C, the height Z3 of the posts 106 is less than the height Z1 of the rail segments 104. In some embodiments, the height Z3 of posts 106 is up to 95, 90, 80, 75, or 70 percent of the height Z1 of the rail segments 104.

Posts useful in the slidable fasteners of the present disclosure may have a variety of cross-sectional shapes in a plane parallel to the fastener backing. For example, the cross-sectional shape of the post may be a polygon (e.g., square, rectangle, rhombus, hexagon, pentagon, or dodecagon), which may be a regular polygon or not, or the cross-sectional shape of the post may be curved (e.g., round or elliptical). In some embodiments, the post has a base attached to the backing and a distal tip, and the distal tip has a cross-sectional area that is less than or equal to a cross-sectional area of the base. The post may taper from its base to its distal tip, but this is not a requirement. In some embodiments, the post has a distal cap with a cap width that is greater than the width of the base. The cap can overhang the base on opposing sides or may overhang the base on all sides. Capped posts useful in the fastener of the present disclosure can have a variety of useful shapes including a mushroom (e.g., with a circular or oval head enlarged with respect to the stem), a nail, a T, or a golf tee.

Referring again to FIGS. 4A, 4B, and 4C, in some embodiments, posts 106 useful in the slidable fastener 100 of the present disclosure have a maximum width X2 of up to about 0.5 mm, 0.4 mm, 0.3 mm, or 0.2 mm and a minimum width of at least 0.05 mm, 0.1 mm, or 0.125 mm. Some useful widths X2 of the posts 106 are in a range from 0.05 mm to 0.5 mm, 0.1 mm to 0.2 mm, or 0.125 mm to 0.175 mm. In some embodiments, posts 106 useful in the fastener of the present disclosure have a maximum length Y2 of up to about 0.5 mm, 0.4 mm, 0.3 mm, or 0.2 mm and a minimum width of at least 0.05 mm, 0.1 mm, or 0.125 mm. Some useful widths Y2 of the post 106 are in a range from 0.05 mm to 0.5 mm, 0.1 mm to 0.2 mm, 0.1 mm to 0.15 mm, or 0.125 mm to 0.175 mm. In some embodiments, the distance Y4 between posts 106 in the direction parallel to the length (l) of the fastener 1 is up to about up to about 1.5 mm (in some embodiments, up to 1.25, 1.0, 0.9, or 0.8) mm and at least about 0.1 mm, 0.2 mm, or 0.4 mm. The distance Y4 between post 106 can be in a range from 0.1 mm to 1.5 mm, 0.2 mm to 1.0 mm, or 0.400 mm to 0.600 mm.

For embodiments such as the embodiment illustrated in FIG. 4C, posts 106 that taper from their bases to their distal tips have a sloping face and a taper angle A2 between the sloping face and the fastener backing 102. In some embodiments, the taper angle A2 between the sloping face of the post 106 and the backing 102 is in a range from 91 degrees to 130 degrees, in some embodiments, in a range from 91 degrees to 125 degrees, 91 degrees to 120 degrees, 91 degrees to 115 degrees, 91 degrees to 110 degrees, 91 degrees to 105 degrees, or 95 degrees to 100 degrees.

In some embodiments, the posts 106 have a maximum height Z3 (above the backing 2) of up to 2.85 millimeter (mm), 1.25 mm, or 1 mm and, in some embodiments, a minimum height of at least 0.08 mm or 0.16 mm. The height Z3 of the posts 106 can be in a range from 0.2 mm to 0.6 mm, 0.3 mm to 0.6 mm, 0.3 mm to 0.4 mm, or 0.35 mm to 0.55 mm. In some embodiments, each of the posts has a height to width aspect ratio that is at least 1.5:1, at least 2:1, or at least 3:1. In some embodiments, each of the posts has a height to length aspect ratio that is at least 1.5:1, at least 2:1, or at least 3:1.

Figure 5A:
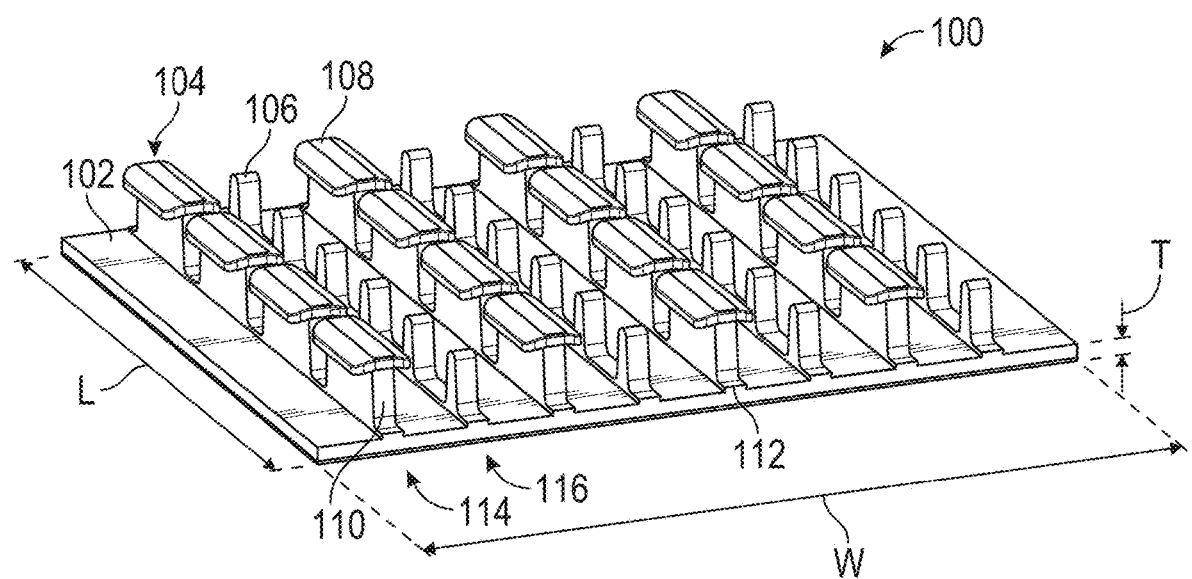
FIG. 5A is a schematic perspective view of another embodiment of a fastener of the present disclosure.
Figure 5B:
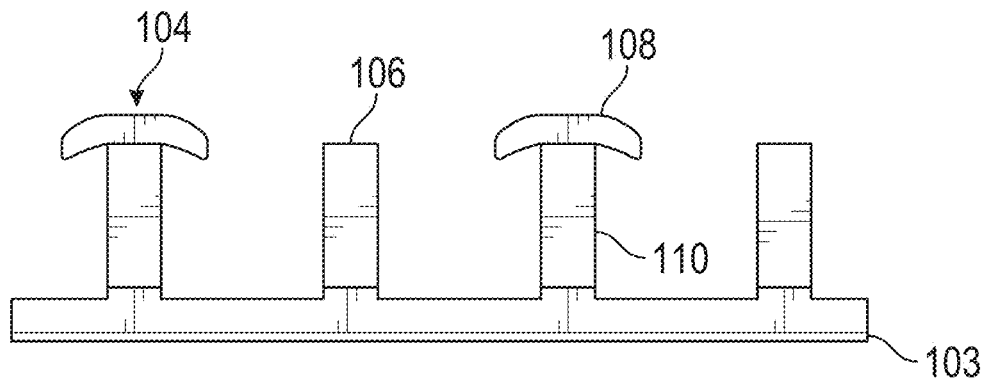
FIG. 5B is a schematic side view of the fastener of FIG. 5A.

Another embodiment of a slidable fastener of the present disclosure is shown in FIGS. 5A and 5B. In this embodiment, the cap portion 108 of the rail segment 104 has a different shape than the cap portion 108 of the embodiment shown in FIGS. 4A, 4B, and 4C. The features and dimensions of any of the embodiments described above for the fastener shown in FIGS. 4A, 4B, and 4C can be used in combination with the fastener shown in FIGS. 5A and 5B to provide corresponding embodiments.

Figure 5C:
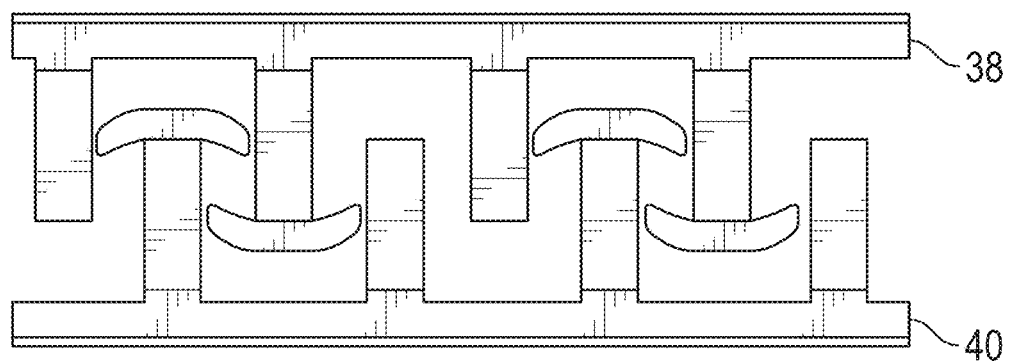
FIG. 5C is a schematic side view of an embodiment of a fastening system of the present disclosure in which both fastener members include the fastener of FIGS. 5A and 5B.
Figure 6A:
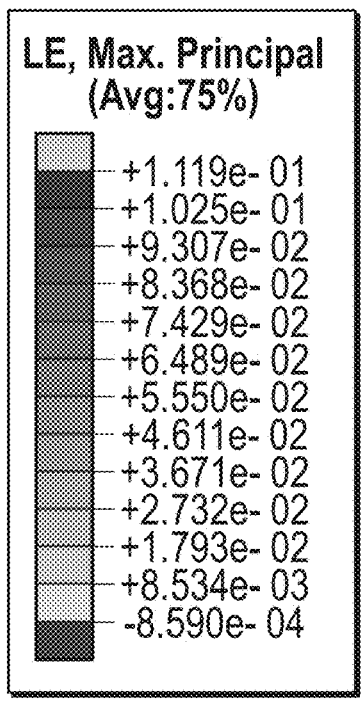
FIG. 6A is a schematic side view of an embodiment of fastener of the present disclosure undergoing deformation during fastening, with strain calculated by Finite Element Modeling depicted by shading.
Figure 6A:
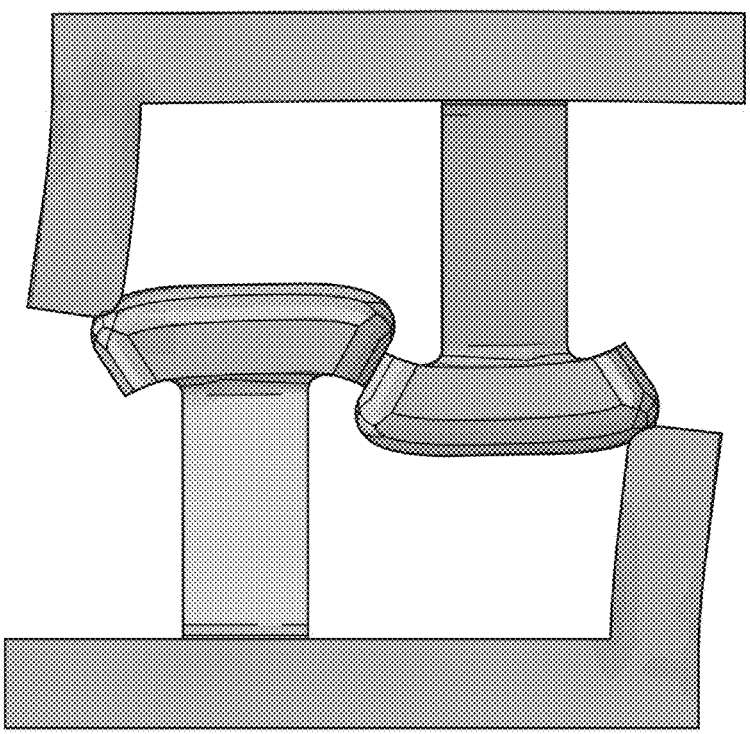
Figure 6B:
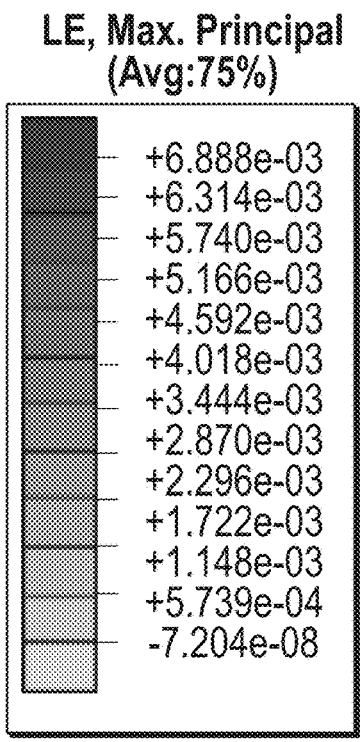
FIG. 6B is a schematic side view of the fastener of FIG. 6A after fastening, with residual strain calculated by Finite Element Modeling depicted by shading.
Figure 6B:
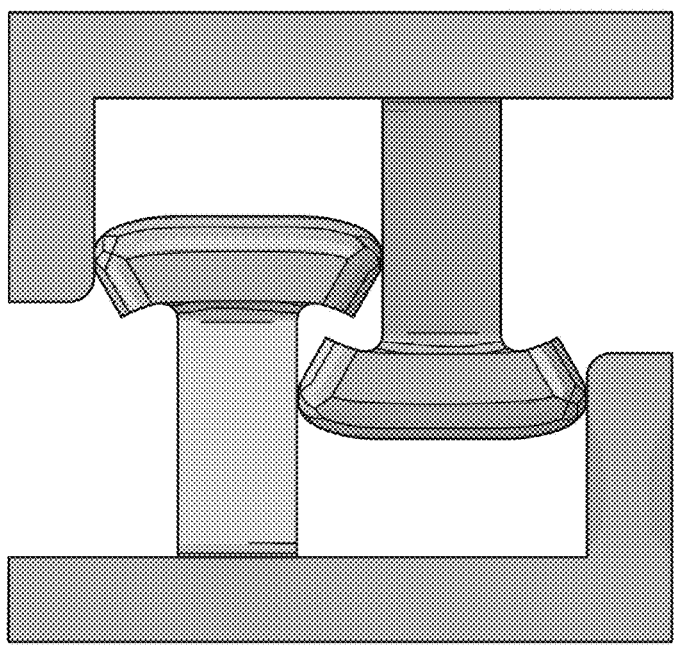

The slidable fastener 100 is useful, for example, as a self-mating fastener. As used herein, self-mating refers to fasteners in which fastening is accomplished by interengaging fastening elements of the same type (e.g., fastening heads). In some embodiments, self-mating refers to fasteners in which fastening is accomplished by interengaging fastening elements of identical shape. In some embodiments, self-mating refers to the ability for the fastener to engage with itself when it is in a folded configuration, for example, along an axis parallel to either the length (L) or width (W) of the fastener, referring to FIGS. 4A and 5A. Two fastener members (e.g., first and second fastener members (38, 40)), each having the structure shown in FIGS. 5A and 5B, for example, can be fastened together in a self-mating engagement as shown in FIG. 5C. In some embodiments, a first fastener member 38 is a fastener of the present disclosure as described above in any of its embodiments, and a second fastener member 40 may include the rail segments but not include the posts. In some embodiments, the first and second fastener members 38, 40 may be different embodiments of the fastener of the present disclosure. For example, the first fastener member 38 may have a cap shape like that shown in FIG. 4A and a second fastener member 40 may have a cap shape like that shown in FIG. 5A. In any of these embodiments, when the first and second fastener members 38, 40 undergo fastening, the posts typically bend away from the rail segments while the cap portions of the rail segments of the first and second fastener members pass by each other as shown in FIG. 6A. The posts then return to their original positions after the first and second fastener members are fastened as shown in FIG. 6B.

Accordingly, in some embodiments, the posts have a lower bending stiffness than that of the rail segments. The bending stiffness k for small strain behavior is determined by Equation 1

$$k = 3EI/H \qquad \text{Equation 1}$$

in which E is the modulus of the material making up the posts and the rail segments, H is the height of the posts or rail segments, and $I=W^3L/12$, in which W is the width and L is the length of the posts or rail segments. In some embodiments, the length of the base portion of the rail segments is greater than a length of the posts. In these embodiments, when the width of the base portion and the width of the posts are similar, the bending stiffness of the rail segments will be higher than the bending stiffness of the posts. Referring again to FIG. 4A, the rows 114 of rail segments 104 can collectively have a higher bending stiffness than rows 116 of post 106. When there are more post 106 in a row 116 of posts, the bending stiffness of the posts can be adjusted (e.g., by selection length or width) so that collectively the row 116 of post 106 has less bending stiffness than a row 114 of rail segments 14. The bending stiffness of each row of rail segments or posts can be determined by the number of rail segments or posts in each row and the bending stiffness of each of the rail segments or posts.

Figure 7:
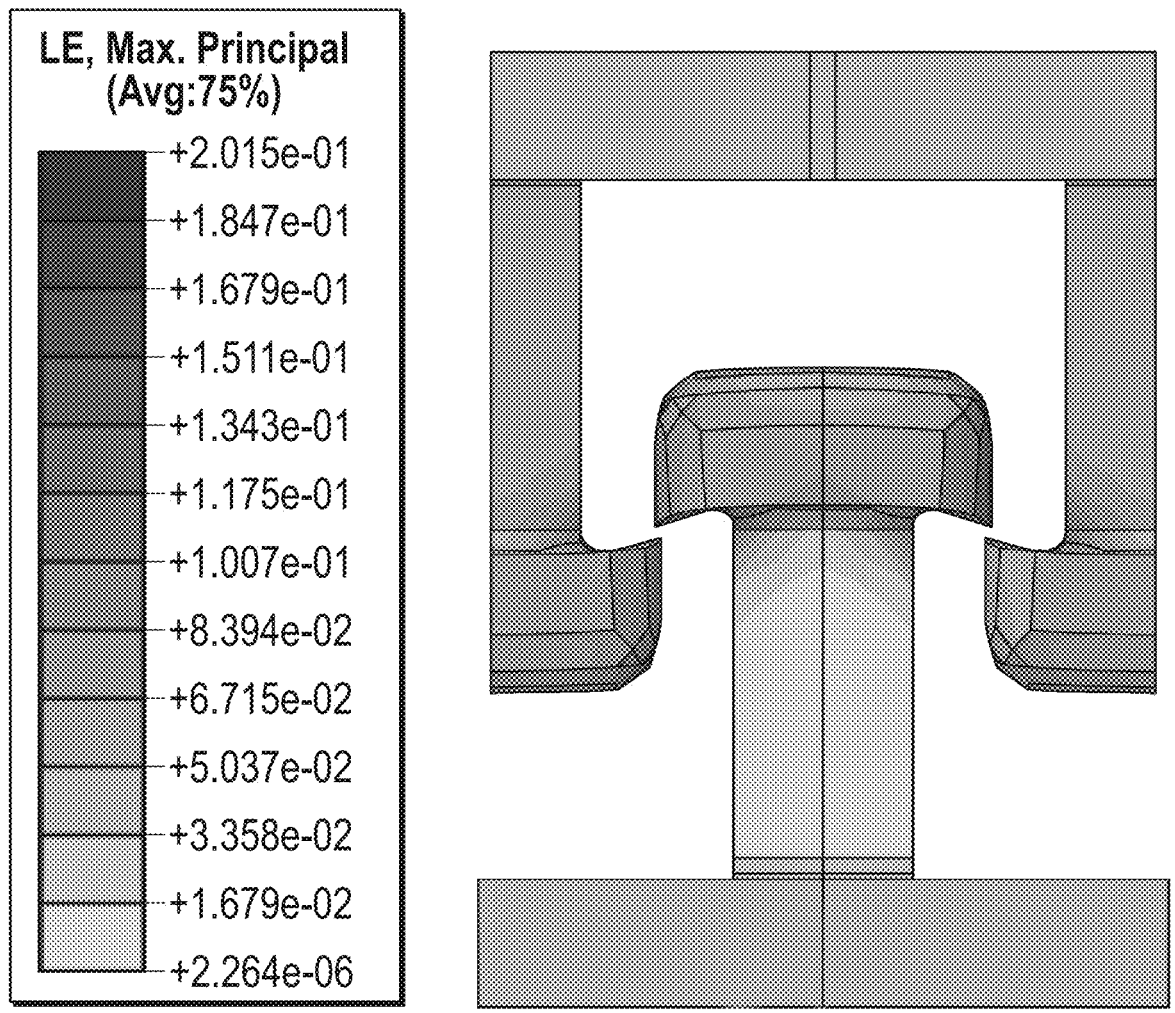
FIG. 7 is a schematic side view of a fastener not according to the present disclosure, with permanent plastic deformation after fastening calculated by Finite Element Modeling depicted by shading.

In some embodiments, the fastening system of the present disclosure is releasably fastenable. As used herein, the term "releasably fastenable" means that the fastener members can alternate between the fastened and unfastened configurations one or more times without destroying the functionality of the fastener. Typically and advantageously, the unique structure of the slidable fasteners of the present disclosure can allow for multiple cycles of fastening and unfastening without excessive plastic (i.e., irreversible) deformation of the engaging rail segments. A comparative fastener that includes rail segments but no posts can undergo fastening when the rail segments are pushed against and past one another for interlocking. The cap portions of the rail segments of comparative fastener exhibit a relative high degree of plastic (i.e., irreversible) deformation after such engagement as shown in FIG. 7. The plastic deformation can limit the ability of the comparative fastener to be unfastened and refastened since the shape of the fastener is altered by the first and successive engagements. In contrast, in the slidable fastening system of the present disclosure when the first and second fastener members undergo fastening, the posts undergo elastic deformation while the cap portions of the rail segments of the first and second fastener members pass by each other as shown in FIG. 6A. The cap portions of the rail segments of the fastener of the present disclosure exhibit a relative low degree of plastic (i.e., irreversible) deformation after engagement as shown in FIG. 6B.

Since fastener 100 illustrated in FIGS. 4A to C and 5A to C is useful, for example, as a self-mating fastener, a shortest distance X8 between one of the post 106 and one of the base portions 110 of the rail segments 104 in adjacent rows 114, 116 is wide enough to allow the insertion of the cap portion 108 of the rail segments 104. Distance X8 may be substantially the same as X4, as described above in any of the embodiment for X4. In some embodiments, distance X8 is within about 20, 15, or 10 percent of the cap width X4. In some embodiments, a ratio of the distance X8 to the width X1 of the base portion 110 is in a range from 2:1 to 5:1 or from 2:1 to 4:1, or the ratio may be about 3:1. Distances X3 and X5 between one of the post 106 and one of the cap portions 108 of the rail segments 104 in adjacent rows 114, 116 is generally smaller than distance X8 since the cap width X4 is wider than the width of the base portion X1.

Some useful distances X3 and X5 are in a range from 0.08 mm to 0.8 mm, 0.1 mm to 0.5 mm, 0.2 mm to 0.4 mm, or 0.2 mm to 0.35 mm. Distances X3 and X5 between a post 106 and two adjacent rows of the caps portions 108 of rail segments 104 need not be equal.

Figure 13A:
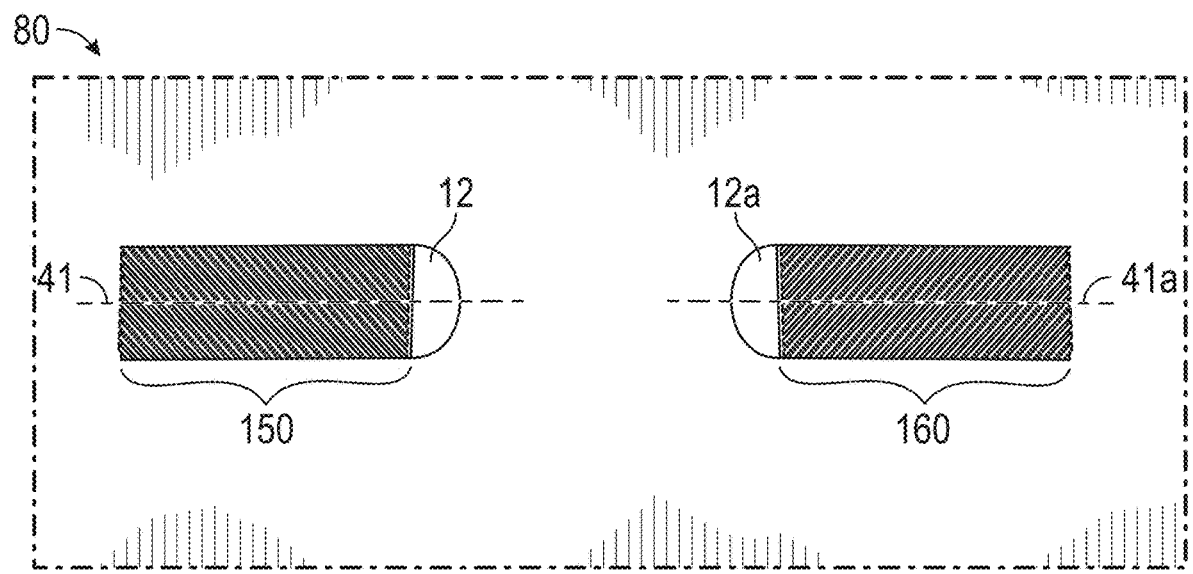
FIG. 13A is a front plan view of two complementary adhesive constructions secured to an object.
Figure 13B:
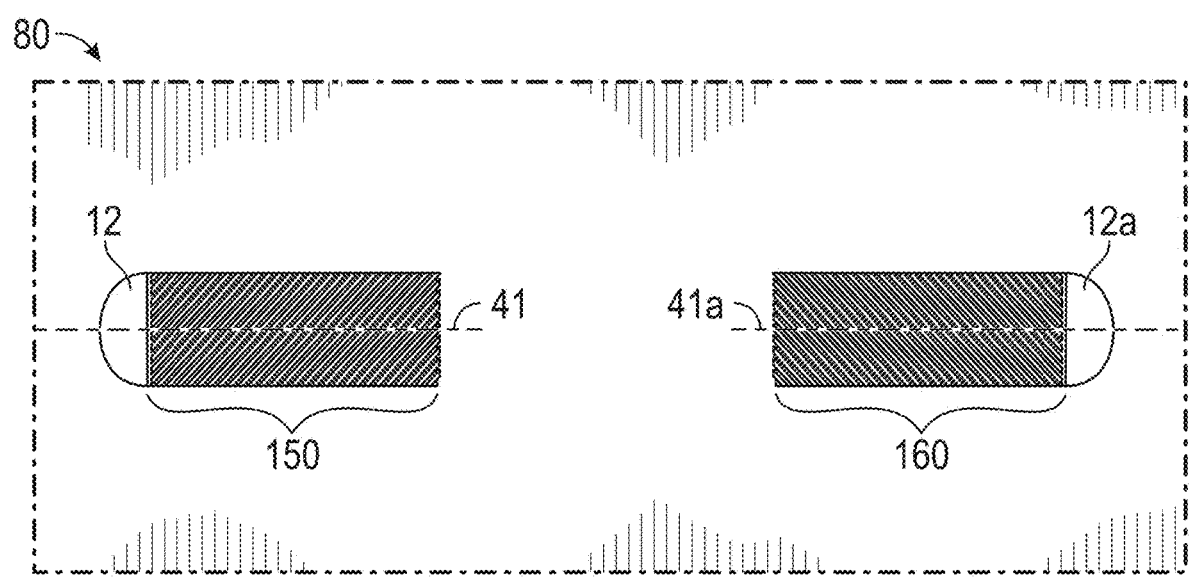
FIG. 13B is a front plan view of another two complementary adhesive constructions secured to an object.

For each of the first and second connector members 38, 40 of the fastening system, the rows 114 and 116 are arranged parallel to a longitudinal axis 41 of the first or second adhesive construction 12, 14, respectively (i.e., a line generally parallel to the length dimension of the requisite adhesive construction backing; see FIG. 1). Alternatively, the rows 114, 116 may be arranged perpendicular to the longitudinal axis 41 of the adhesive construction. In yet other embodiments, the direction of extension of the rows 114, 116 may be oriented an oblique angle relative to the longitudinal axis 41. This orientation could allow for unique paths of travel between the first and second adhesive constructions 12, 14 and allow for greater degrees of rotation between the constructions 12, 14 when the article 10 is used to mount an object. For instance, the rows may be oriented at a 45-degree angle relative to the longitudinal axis 41, as depicted in FIGS. 13A and 13B.

The direction of extension of the rows 114 and/or 116 will typically dictate the principal sliding path of a slidable fastener system. Having the rows 114, 116 arranged parallel to the longitudinal axis 41 of the first and second adhesive constructions 12, 14 will allow greater movement along the principal path, while arranging the rows perpendicular will allow less sliding length while the fastener system is engaged. Of course, it should be appreciated that the effect of the orientation on the length of the principal path may change for adhesive construction having a different length:width ratio or a different shape than rectangular.

A secondary sliding path can be dictated by the gap between adjacent rows of fastening elements (e.g., at least one of rails and posts). For the slidable fastener 100, the gap is defined by at least the difference between one of the shortest distance X8 between adjacent rows 114, 116 and the largest cap distance X4. The secondary sliding path is accordingly orthogonal to the primary sliding path. While some movement along the secondary path is typically possible due to the gap described above, the secondary path is deliberately substantially shorter than the primary path; some additional movement may be engineered but risks deleteriously affecting the mating ability and shear strength of the fastener.

Figure 14:
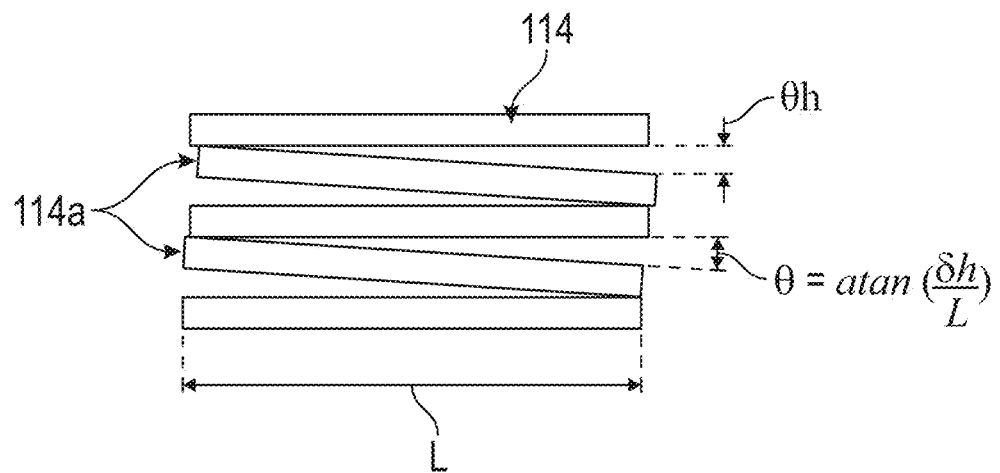
FIG. 14 is representation of opposing, mated fastening elements permitting for rotational movement.

The degree of movement θ in the secondary path can, in certain embodiments, be governed by the following Equation 2 and represented in FIG. 14:

$$\theta = \operatorname{atan}\left(\frac{\delta h}{L}\right) \qquad \text{Equation 2}$$

where δh is the gap between mated fastening elements (rows 114 and 114a in FIG. 14) and L is the length of the fastening element and/or the primary path.

Figure 8:
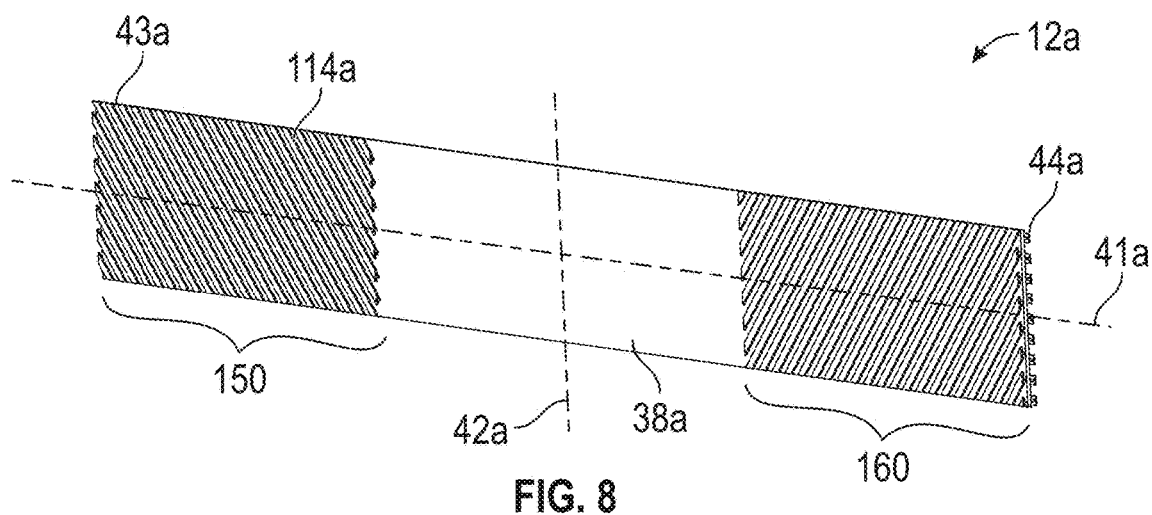
FIG. 8 is a perspective view of an adhesive construction according to another embodiment of the present disclosure.

Not all rows 114, 116 need be oriented in the same direction across a surface. One such construction 12a is depicted in FIG. 8. A separable connector member 38a includes a first collection 150 of rows 114a of fastening elements (here continuous rails) arranged at a 135-degree angle relative to the longitudinal axis 41a, with the rail(s)/posts extending away from the center line 42a as an upper, outer edge 43a of the construction 12a is approached. The separable connector 38a further includes a second collection 160 of rows 114a separated from the first collection 150 and arranged at a 45-degree angle relative to the longitudinal axis 41a, with the rails/posts also extending away from the center line 42a as an upper, outer edge 44a of the construction 12a is approached. This complementary row orientation allows the two primary paths in combination to generate a motion that is predominately a rotation with some small translation. In FIG. 8, the center of rotation of that motion is located above the longitudinal axis 41a.

Figure 9:
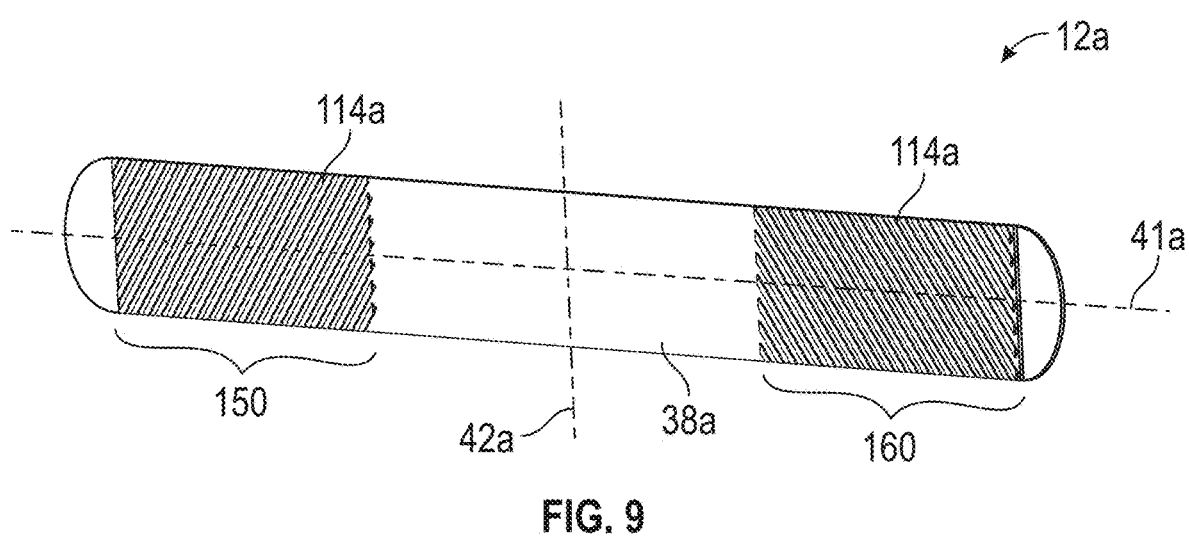
FIG. 9 is a perspective view of an adhesive construction according to another embodiment of the present disclosure.

The rows of fastening elements may also be configured on a single construction 12a to allow movement about a center of rotation that is below the longitudinal axis 41a, with collections 150, 160 of rows of fastening elements both extending the center line 42a in opposing fashion, as seen in FIG. 9. While the fastening elements are depicted as essentially the same in each collection 150, 160, other embodiments of the present disclosure may feature different fastening elements or fastening systems in either collection 150, 160 (e.g., collection 150 may be comprised exclusively of rails, and collection 160 may be comprised of rails and posts).

The first and second connector members 38, 40 of the fastening system according to some embodiments of the present disclosure may or may not be connected together. In some embodiments, the first and second fastener members may be connected to two discrete fastener backings and/or adhesive constructions. In some embodiments, the first and second fastener members may be part of the same strip of material in which the first fastener member 38 is folded over to contact the second fastener member 40.

The backing of the fastener of the present disclosure may have a variety of thicknesses. In some embodiments, including the embodiments illustrated in FIGS. 4A to 4C and FIGS. 5A to 5C, the thickness (Z4-Z5) of the backing 102 integral with the rail segments 104 and post 106 may be up to about 300 micrometers (μm), 250 micrometers, or 200 micrometers and at least about 50 micrometers or 75 micrometers. This thickness does not include the heights of the rail segments and posts protruding from the first major surface of the backing. In some embodiments, the thickness of the thermoplastic backing is in a range from 50 to about 300 micrometers, from about 50 to about 200 micrometers, or from about 50 to about 150 micrometers.

In some embodiments, including the embodiments illustrated in FIGS. 4A to 4C and FIGS. 5A to 5C, the rows of rail segments 114 and rows of posts 116 are each independently formed on fillets 112. Referring to FIG. 4B, the fillet thickness Z6 above the fastener backing 102 may be up to about 100 micrometers (μm), 75 micrometers, or 50 micrometers and at least about 10 micrometers or 15 micrometers. This thickness does not include the heights of the rail segments and posts protruding from the first major surface of the backing. In some embodiments, the fillet thickness Z6 is in a range from 10 to about 100 micrometers, from about 15 to about 75 micrometers, or from about 20 to about 50 micrometers. In some embodiments, the backing, excluding the rail segments, posts, and fillets, is substantially uniform in thickness. For a thermoplastic that is substantially uniform in thickness, a difference in thickness between any two points in the backing may be up 5, 2.5, or 1 percent.

Rail segments on the first surface of the backing may have a density of at least 10 per square centimeter ($cm^2$) (63 per square inch $in^2$). For example, the density of the rail segments may be at least 100/$cm^2$ (635/$in^2$), 248/$cm^2$ (1600/$in^2$), 394/$cm^2$ (2500/$in^2$), or 550/$cm^2$ (3500/$in^2$). In some embodiments, the density of the rail segments may be up to 1575/$cm^2$ (10000/$in^2$), up to about 1182/$cm^2$ (7500/$in^2$), or up to about 787/$cm^2$ (5000/$in^2$). Densities in a range from 10/$cm^2$ (63/$in^2$) to 1575/$cm^2$ (10000/$in^2$) or 100/$cm^2$ (635/$in^2$) to 1182/$cm^2$ (7500/$in^2$) may be useful, for example. The density of the rail segments is related to the distance between rail segments X7, measured as the center-to-center distance of the rail segments in adjacent rows as shown in FIG. 4B. A variety of distances X7 between rows of rail segments can be useful. In some embodiments, the distance X7 between rows of rail segments is 0.25 mm to 2.5 mm, 0.5 mm to 1.5 mm, or 0.6 mm to 1.2 mm. The spacing of the rows of rail segments and the posts need not be uniform.

The slidable fasteners of the present disclosure suitable for use in the separable connection 16 may be made from a variety of suitable materials, including thermoplastics. Examples of thermoplastic materials suitable for making the fastener using the methods described above include polyolefin homopolymers such as polyethylene and polypropylene, copolymers of ethylene, propylene and/or butylene; copolymers containing ethylene such as ethylene vinyl acetate and ethylene acrylic acid; polyesters such as poly (ethylene terephthalate), polyethylene butyrate, and polyethylene naphthalate; polyamides such as poly(hexamethylene adipamide); polyurethanes; polycarbonates; poly(vinyl alcohol); ketones such as polyetheretherketone; polyphenylene sulfide; and mixtures thereof. In some embodiments, the thermoplastic useful for making the fastener comprises at least one of a polyolefin, a polyamide, or a polyester. In some embodiments, the thermoplastic useful for making the fastener is a polyolefin (e.g., polyethylene, polypropylene, polybutylene, ethylene copolymers, propylene copolymers, butylene copolymers, and copolymers and blends of these materials). In some embodiments, the fastener of the present disclosure is made from a blend of any of these thermoplastic materials and an elastomer. Examples of elastomers useful include elastomers such as ABA block copolymers (e.g., in which the A blocks are polystyrenic and formed predominantly of substituted (e.g., alkylated) or unsubstituted moieties and the B blocks are formed predominately from conjugated dienes (e.g., isoprene and 1,3-butadiene), which may be hydrogenated), polyurethane elastomers, polyolefin elastomers (e.g., metallocene polyolefin elastomers), olefin block copolymers, polyamide elastomers, ethylene vinyl acetate elastomers, and polyester elastomers. Examples of useful polyolefin elastomers include an ethylene propylene elastomer, an ethylene octene elastomer, an ethylene propylene diene elastomer, an ethylene propylene octene elastomer, polybutadiene, a butadiene copolymer, polybutene, or a combination thereof. Elastomers are available from a variety of commercial sources as described below. Any of these elastomers may be present in a blend with any of the thermoplastics in an amount of up to 20, 15, or 10 percent by weight. Further details regarding the materials suitable for the fastener and fastener backing may be found below.

The area of connection and the type of the separable connection 16 can be selected so that the force required to separate the first and second adhesive constructions 12, 14 is substantially lower than that required to remove an adhesive layer from an adherend. Such a force may be applied in a direction substantially perpendicular to the general plane of the connection 16. The separable connection 16 can provide sufficient strength along the general plane of its separation so that, depending on the specific application, the separable connection 16 will not separate based on the use of the adhesive article for mounting an object on a mounting surface. The separable connection 16 can provide an internal static shear strength in a direction parallel to the general plane for supporting the mounted object (e.g., a hardgood).

Figure 10:
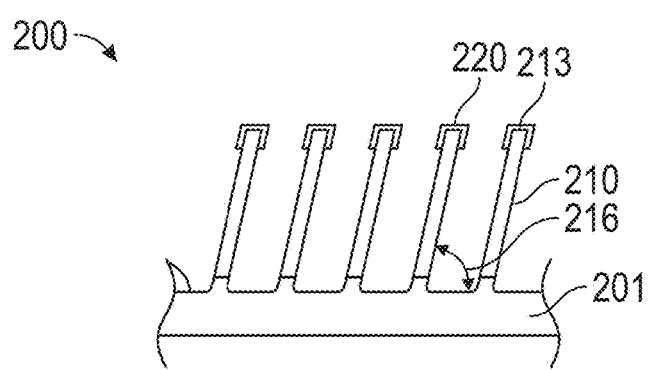
FIG. 10 is a partial cross-sectional view of a slidable fastener according to another embodiment of the present disclosure.

Slidable fasteners useful in the present disclosure may also rely on rows of canted posts of the general type shown in U.S. Pat. No. 7,467,873 (Clarke et al.) and depicted in FIG. 10. Such posts 210 extend at an oblique angle 216 relative to the base 201 of the fastener 200, and may also permit sliding movement when complementary, mating rows of posts 210 are engaged. The top surface 213 of the post 210 may be capped with an adhesive 220 or another elastomeric cap material. Slidable fasteners of this type may hinder repeated mating between separable connectors members 38, 40, unless the connector members are engaged and disengaged entirely by sliding along the primary path.

Figure 11A:
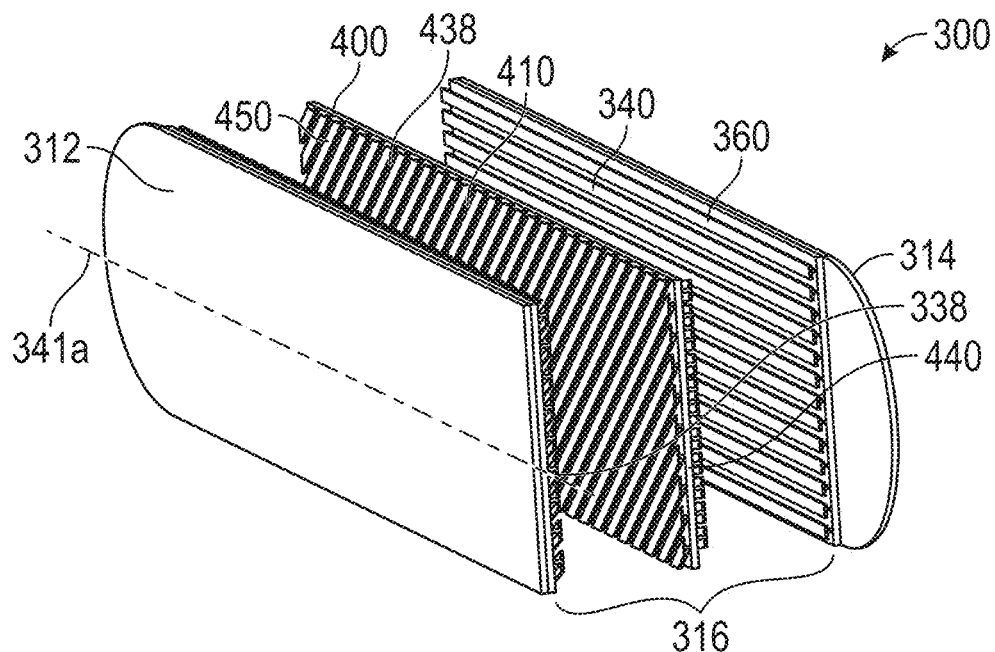
FIG. 11A is an exploded view of an adhesive mounting article according to another embodiment of the present disclosure, from a perspective facing the second adhesive construction.
Figure 11B:
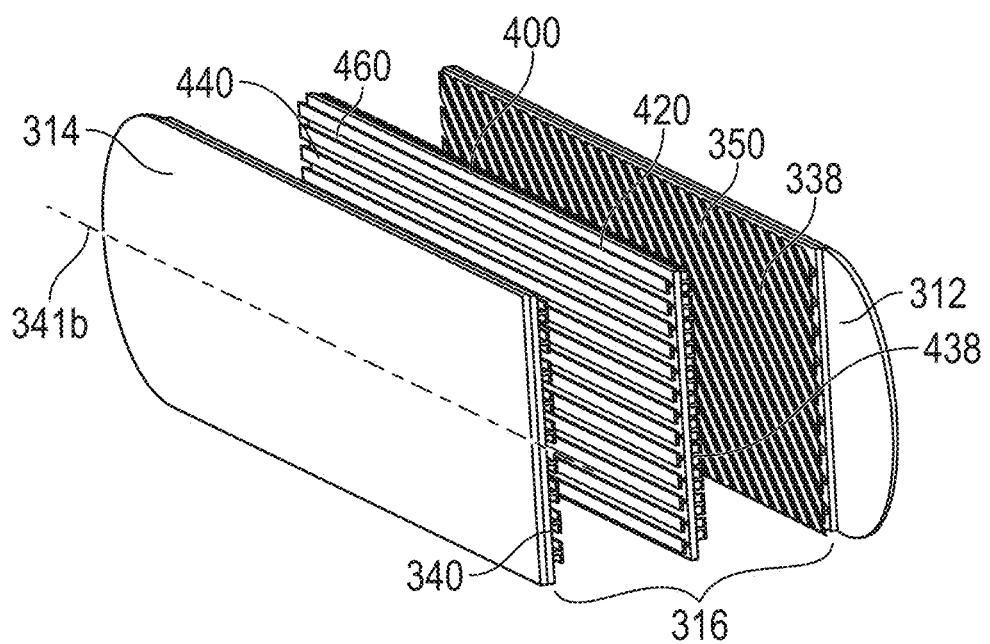
FIG. 11B is an exploded view of the adhesive mounting article of FIG. 11A from a perspective facing the first adhesive construction.

Turning to FIGS. 11A and 11B, another adhesive article 300 of the present disclosure that features an intermediate separable connector is depicted. Adhesive article 300 includes a separable connection system 316 between first and second adhesive constructions 312, 314. Unless specifically noted, the considerations and elements of article 300 are the same as adhesive article 100 and need not be repeated here. The separable connection system 316 includes a first connector member 338 disposed on the second major surface 350 of the first adhesive construction 312, and a second connector member 340 disposed on the second major surface 360 of second adhesive construction 314. An intermediate separable connector 400 is disposed between the first and second separable connectors 338, 340. The intermediate connector 400 includes a third separable connector member 438 on a first surface 410 and a fourth separable connector member 440 on an opposing, second surface 420. The first and second separable connector members 338 and 340 are engageable with the third and fourth connector members 438, 440, respectively, to form a separable connection, thereby detachably connecting the adhesive constructions 312, 314.

Advantageously, the intermediate connector 400 can permit movement of the adhesive article 300 along two primary sliding paths. For instance, and as depicted in FIGS. 11A and 11B, the first and third separable connector components 338, 438 include mating rows of rails and/or posts 350, 450 arranged at about a 45-degree angle relative to the longitudinal axis 341a of the first adhesive construction; the first adhesive construction 312 is thereby configured for angular movement relative to the second adhesive construction 314. In contrast, the second and fourth separable connector components 340, 440 include mating rows of rails and/or posts 360, 460 arranged in parallel relative to the longitudinal axis 341b of the second adhesive construction 314.

Additional primary sliding paths may be created, in other embodiments, by including one or more additional separable fasteners within the body of the intermediate connector 400.

Adhesive Articles

Adhesive articles of the present disclosure typically have excellent shear strength.

In some embodiments, one or both the adhesive constructions 12, 14 in the adhesive article have an elongation at break of at least 400%. Some adhesive articles of the present disclosure have an elongation at break of between about 400% and about 1500% in at least one direction. In some embodiments, the stretch releasable article can be stretched at least 100 percent, at least 150 percent, at least 200 percent, at least 300 percent, at least 400 percent, or at least 500 percent without breaking. The stretch releasable layer and/or film can often be stretched up to 1500 percent, up to 1200 percent, up to 1000 percent, up to 800 percent, up to 750 percent, or up to 700 percent without breaking. These relatively large elongation values facilitate stretch releasing of one or both of the adhesive constructions 12, 14 of the present disclosure after being adhered to a substrate. Some adhesive articles of the present disclosure feature one or both adhesive constructions having a tensile strength at break sufficiently high so that the adhesive article will not rupture prior to being stretched and removed from an adherend at an angle of 35° or less.

In some embodiments, one or both of the adhesive constructions 12, 14 in the adhesive article exhibit an elastic recovery of greater than 70% or greater than 80% or greater than 95% at 10% strain. In some embodiments, the adhesive article exhibits an elastic recovery of greater than 70% or greater than 80% or greater than 90% at 25% strain. In some embodiments, one or both of the adhesive constructions 12, 14 in the adhesive article exhibit an elastic recovery of greater than 70% or greater than 80% or greater than 90% or greater than 95% at 50% strain. In some embodiments, one or both of the adhesive constructions 12, 14 in the adhesive article exhibit an elastic recovery of greater than 50% or greater than 70% or greater than 95% at 100% strain.

In some embodiments that use a backing in either of both of the adhesive constructions 12, 14, the backing and/or at least some of the backing layers are substantially optically clear. As used herein, the term "optically clear" means having a light transmission of at least about 50% and/or a haze of no greater than 40%. Some embodiments have a light transmission of at least about 75%. Some embodiments have a haze of no greater than 20%. Some embodiments have a haze of no greater than 20%. Both the light transmission and the haze of the carrier (or at least some of the layers thereof) can be determined using, for example, ASTM D1003-95.

In some embodiments, one or both of the adhesive constructions 12, 14 of the adhesive article further include a tab. The tab is an area that can be easily accessed by the user to assist in or begin to stretch release the adhesive article from the adherend. The removal tab can be tacky from the outermost adhesive layer or non-tacky by being covered by layers of stretch film, non-stretch film, release liner, or from detackified adhesive.

In some embodiments, the adhesive article further includes one or more release liners on an exposed adhesive surface of one or both adhesive constructions 12, 14. The release liner can be, for example, on either or both of the major surfaces of some or all adhesive layers. The release liner protects the adhesive during manufacturing, transit, and before use. When the user desires to use the adhesive article, the user can peel or remove the release liner to expose the adhesive. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy-based release material to provide a release liner. Suitable release liners and methods for treating liners are described in, e.g., U.S. Pat. No. 4,472,480 (Olson), 4,980,443 (Kendziorski) and 4,736,048 (Brown), and incorporated herein. Preferred release liners are fluoroalkyl silicone polycoated paper. The release liners can be printed with lines, brand indicia, or other information.

In some embodiments, one or both adhesive constructions in the adhesive article has a thickness that is between about 2 mils and about 40 mils. In some embodiments, the thickness is greater than 3 mil, greater than 4 mil, greater than 5 mils, greater than 8 mils, greater than 10 mils, greater than 12 mils, greater than 15 mils, or greater than 20 mils. In some embodiments, the thickness is less than 40 mils, less than 38 mils, less than 35 mils, less than 33 mils, less than 30 mils, less than 28 mils, less than 25 mils, less than 22 mils, or less than 20 mils.

In some embodiments, a force of between about 1N and about 50N per inch width is required to strain one or both adhesive constructions in the adhesive article 10% in tensile elongation as measured according to ASTM D638-14 and/or ASTM D412-06a. In some embodiments, a force of between about 2N and about 30N per inch width is required to strain the adhesive article 10% in tensile elongation as measured according to ASTM D638-14 and/or ASTM D412-06a. In some embodiments, a force of between about 3N and about 15N per inch width is required to strain the adhesive article 10% in tensile elongation as measured according to ASTM D638-14 and/or ASTM D412-06a.

In some embodiments, one or both adhesive construction in the adhesive article has an elongation at break of at least 400%. Some adhesive articles of the present disclosure feature one or both of the adhesive constructions having an elongation at break of between about 400% and about 1500% in at least one direction. In some embodiments featuring one or more stretch releasable adhesive constructions, the stretch releasable construction can be stretched at least 100 percent, at least 150 percent, at least 200 percent, at least 300 percent, at least 400 percent, or at least 500 percent without breaking. The stretch releasable construction can often be stretched up to 1500 percent, up to 1200 percent, up to 1000 percent, up to 800 percent, up to 750 percent, or up to 700 percent without breaking. These relatively large elongation values facilitate stretch releasing of the relevant adhesive construction after being adhered to a substrate.

The separable connector system 16 typically provides an internal static shear strength in a direction parallel to the surfaces of the adhesive layers 24 and 32 for supporting the objects between which the adhesive article 10 is attached in that direction. That is, the shear strength of the connection 16 preferably equals or exceeds the highest shear force that the adhesive can develop with surfaces to which it is applied (e.g., about six pounds per square inch (0.041 MPa)).

In some embodiments when the adhesive article 10 is used to attach an object to the surface of wallpaper or unpainted drywall, the dynamic tensile force in a direction perpendicular to the surfaces of the adhesive layers 24 and 32 and the general plane of separation of the separable connection 16 can typically be no more than about 8 to 10 pounds per square inch (0.055 to 0.069 MPa) to preclude the possibility of damage to such surfaces. In contrast, when the adhesive article 10 is used to attach an object to some painted surfaces, e.g., the surface of a painted cement block wall, or a metal cabinet with baked on paint, or to the surface of glass or ceramic material, the dynamic tensile force required to separate the separable connection 16 can be up to 30, 35 or even 40 pounds per square inch (0.21, 0.24, or 0.276 MPa) without causing damage to such surfaces. When the adhesive article 10 is used to attach an object to the surface of yet other types of materials (e.g., wood or veneer) the dynamic tensile force in the perpendicular direction required to separate the connector system 16 should typically be in the range of about 20 to 30 pounds per square inch (0.14 to 0.21 MPa) to restrict damages to those surfaces. When other release mechanisms and forces (e.g., peel or cleavage) are applied, the same concerns are preferably addressed. That is, it is desirable to provide a requisite separation force without causing damage to one or both of the adhered surfaces. For example, where a peel force, cleave force or combination of forces (including combinations with a perpendicular lift force) is/are to be applied for removal, the separable connector system 16 may be separated by the application of lower force values.

Constituent elements of the adhesive articles described herein are explored in more detail below.

Backing

Adhesive Construction & Intermediate Connector Backing

If used in one or both adhesive constructions, the adhesive backing can be a single layer or a multilayer construction. More than one backing layer can be present in the backing. Multiple backing layers can be separated by layers of film, which may further contain one or more layers. In some embodiments, the backing includes at least one of plastic, metal, paper, nonwoven material, textile, woven material, foam, adhesive, gel, and/or a filament reinforced material. In some embodiments, the backing is at least one of a single layer of material or a multilayer film. In other embodiments, the backing can be an arrangement of particles disposed between adjacent adhesive layers.

In some embodiments, two or more sub-layers can be co-extruded so as to form the backing. In some embodiments, the backing is flexible. Some embodiments include dyes or pigments in the backing layer. Some embodiments include at least one tackifier in at least one layer of the backing. Some embodiments include a plasticizing oil in one or more layers of the backing.

The adhesive backing can be any desired shape including, for example, square, rectangle, triangular, polygon, circular, quadrilateral, trapezoidal, cylindrical, half-circular, star-shaped, half-moon shaped, tetrahedral, etc.

The adhesive backing can be made of any desired material or materials. Representative examples of materials suitable for the backing can include, for example, polyolefins, such as polyethylene, including high density polyethylene, low density polyethylene, linear low density polyethylene, and linear ultralow density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadienestyrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

In some embodiments, the adhesive backing is or includes a composite foam that includes a flexible polymeric foam layer, a first film laminated to a first major surface of the foam layer, and a second film laminated to a second, opposite major surface of the foam layer. Adhesive(s) can be attached to the films to form a structure of adhesive-film-foam-film-adhesive. The flexible polymeric foam layer can be chosen to optimize conformability and resiliency properties which are helpful when an adhesive article is to be adhered to surfaces having surface irregularities. Such is the case with a typical wall surface. An exemplary flexible polymeric foam layer is commercially available under the trade designation "Command" from 3M Company of St. Paul, Minn. In some embodiments, the flexible polymeric foam layer of the backing can include polyolefin foams which are available under the trade designations "Volextra" and "Volara" from Voltek, Division of Sekisui America Corporation, Lawrence, Mass. In some embodiments, the backing is or includes a metal or is metal-like. In some embodiments, the backing is or includes wood or is wood-like.

The adhesive backing can be or include one of the materials or backings described in any of the following, all of which are incorporated in their entirety herein: International Publication Nos. WO2015/195344 (Runge et al.), WO2017/136432 (Runge et al.), and WO2019/005831 (Hoffman et al.).

In some embodiments, the adhesive backing material has a storage modulus of between about $15 \times 10^3$ Pa and about $2.5 \times 10^6$ Pa at 25 degrees Celsius. In other embodiments including those with glass materials or other ceramics, the backing material can have a storage modulus of up $1 \times 10^{10}$ Pa. In some embodiments, the backing material has a tan δ (where tan δ is the loss modulus divided by the storage modulus) of between about 0.4 and about 1.2 at 25 degrees Celsius. In some embodiments, the backing has a glass transition temperature of between about −125 and about 40 degrees Celsius. In other embodiments, the backing material has a stress relaxation between 10% and 100% after 10 seconds.

In some embodiments, the adhesive backing exhibits an elastic recovery of 1-99% at 10% strain. In some embodiments, the backing exhibits an elastic recovery of 1-99% at 20% strain. In some embodiment of the disclosure, the backing material has an elongation at break of greater than 50% in at least one direction. In some embodiment of the disclosure, the backing material has an elongation at break of between about 50% and about 1200% in at least one direction.

In some embodiments, the adhesive backing has a Young's modulus of between about 100 psi and about 100,000 psi. In other embodiments featuring glass materials or ceramics, the backing may have a Young's modulus of up to 10,000,000 psi. In some embodiments, the backing exhibits an elastic recovery of 1-100% at 10% strain as measured by ASTM D5459-95. In some embodiments, the backing exhibits an elastic recovery of 1-100% at 20% strain.

In some embodiments, the adhesive backing has a modulus of elasticity and/or a modulus of secant of between about 100 psi and about 15,000 psi as determined by at least one of ASTM D638-14 and ASTM D412-06a. In some embodiments, the backing has a modulus ranging between 100 psi and 15000 psi. In some embodiments the modulus is greater than 100 psi, greater than 500 psi, greater than 1000 psi. In some embodiments the backing modulus is less than 15000 psi, less than 10000 psi, less than 8,000 psi, less than 5,000 psi, less than 3,500 psi, less than 2000 psi, and less than 1500 psi.

In some embodiments, the adhesive backing has a thickness of between about 0.1 mils and about 100 mils. In some embodiments, the backing has a thickness of greater than 1 mil, greater than 5 mils, greater than 8 mils, greater than 10 mils, greater than 12 mils, greater than 15 mils, greater than 20 mils, greater than 22 mils, or greater than 24 mils. In some embodiments, the backing has a thickness of less than 100 mils, less than 90 mils, less than 80 mils, less than 75 mils, less than 70 mils, less than 65 mils, less than 60 mils, less than 55 mils, less than 50 mils, less than 45 mils, less than 40 mils, less than 38 mils, less than 35 mils, less than 32 mils, less than 30 mils, less than 28 mils, or less than 25 mils.

Fastener and Fastener Backing

In some embodiments, the fastener backing may serve as the adhesive construction backing for one or both of the opposing adhesive constructions. In such embodiments, one major surface of the fastener includes one or more rails and/or post, and the opposing major surface includes an adhesive layer suitable for bonding the construction to a substrate.

In some embodiments, the fastener backing can be monoaxially or biaxially stretched. Stretching in the machine direction can be carried out on a continuous web of the backing, for example, by directing the web over rolls of increasing speed. Stretching in a cross-machine direction can be carried out on a continuous web using, for example, diverging rails or diverging disks. A versatile stretching method that allows for monoaxial and sequential biaxial stretching of the thermoplastic layer employs a flat film tenter apparatus. Such an apparatus grasps the thermoplastic layer using a plurality of clips, grippers, or other film edge-grasping means along opposing edges of the thermoplastic web in such a way that monoaxial and biaxial stretching in the desired direction is obtained by propelling the grasping means at varying speeds along divergent rails. Increasing clip speed in the machine direction generally results in machine-direction stretching. Stretching at angles to the machine direction and cross-direction are also possible with a flat film tenter apparatus. Monoaxial and biaxial stretching can also be accomplished, for example, by the methods and apparatus disclosed in U.S. Pat. No. 7,897,078 (Petersen et al.) and the references cited therein. Flat film tenter stretching apparatuses are commercially available, for example, from Brückner Maschinenbau GmbH, Siegsdorf, Germany.

In some embodiments, after stretching, the fastener backing has an average thickness of up to 150 µm, 125 µm, 100 µm, 80 µm, or 75 µm. In some embodiments, the average thickness of the backing after stretching is in a range from 30 µm to 150 µm, 50 µm to 150 µm, or 50 µm to 125 µm. In general, the backing has no through-holes before or after stretching. In some embodiments, the density of the rail segments and/or posts after stretching may be up to about 1182/cm$^2$ (7500/in$^2$) or up to about 787/cm$^2$ (5000/in$^2$). Densities after stretching in a range from 2/cm$^2$ (13/in$^2$) to 1182/cm$^2$ (7500/in$^2$), 124/cm$^2$ (800/in$^2$) to 787/cm$^2$ (5000/in$^2$), 248/cm$^2$ (1600/in$^2$) to 550/cm$^2$ (3500/in$^2$), or 248/cm$^2$ (1600/in$^2$) to 394/cm$^2$ (2500/in$^2$) may be useful, for example. Again, the spacing of the spacing of the rows of rail segments and the posts need not be uniform.

In some embodiments, the backing includes a multi-layer construction. The multi-layer construction can include from 2 to 10, 2 to 5, or 2 to 3 layers. The multiple layers can include films, adhesives, and tie layers. The multiple layers can be joined together using a variety of methods including coating, adhesive bonding, and extrusion lamination. In some embodiments, the backing having the protruding rail segments and posts can be made (e.g., using any of the methods described above) from a multilayer melt stream of thermoplastic materials. This can result in the protruding rail segments and posts formed at least partially from a different thermoplastic material than the one predominately forming the backing. Various configurations of upstanding posts made from a multilayer melt stream are shown in U.S. Pat. No. 6,106,922 (Cejka et al.), for example. In some embodiments, the thickness of the backing (including a multi-layer backing) combined with the height of the rail segments is up to 3300, 2000, 1000, 900, 800, 700, 650, 600, 500, 540, or 400 micrometers. In some embodiments, the thickness of the fastening system according to the present disclosure, in which the first and second fastener members are engaged with each other is up to 3300, 2000, 1000, 900, 800, 750, or 700 micrometers.

The bending stiffness of the fastener (e.g., at an axis parallel to the width of the fastener) is influenced by the modulus of the material or materials making up the backing, the thickness of the layer or layers making up the backing, the distance between the structures (including rail segments and posts) on the backing, and the dimension of the fastener in a parallel to the bending axis. In general, materials, thicknesses of the layer or layers in the fastener, and distances between structures can be selected to provide the fastener with a desirable bending stiffness. Advantageously, in many embodiments of the fastener of the present disclosure, the bending stiffness of the fastener is low enough such that the fastener does not unintentionally open when the fastener is bent. In some of these embodiments, the bending stiffness of the fastener in a closed configuration is in a range from 100 mN/mm to 1500 mN/mm, 200 mN/mm to 1200 mN/mm, or 300 mN/mm to 1000 mN/mm as measured by a Flexural Stiffness Test Method, for example, as described in the Examples, below.

In some embodiments, the fastener of the present disclosure and/or the backing of the fastener includes a tie layer. Tie layers can include elastomeric materials or other materials that have lower melting points than the backing integral with the rail segments and posts. Examples of elastomers useful in such tie layers include elastomers such as ABA block copolymers (e.g., in which the A blocks are polystyrenic and formed predominantly of substituted (e.g., alkylated) or unsubstituted moieties and the B blocks are formed predominately from conjugated dienes (e.g., isoprene and 1,3-butadiene), which may be hydrogenated), polyurethane elastomers, polyolefin elastomers (e.g., metallocene polyolefin elastomers), olefin block copolymers, polyamide elastomers, ethylene vinyl acetate elastomers, and polyester elastomers. Examples of useful polyolefin elastomers include an ethylene propylene elastomer, an ethylene octene elastomer, an ethylene propylene diene elastomer, an ethylene propylene octene elastomer, polybutadiene, a butadiene copolymer, polybutene, or a combination thereof. Various elastomeric polymers and other polymers may be blended to have varying degrees of elastomeric properties. For example, any of these elastomeric materials may be present in a range from 50% by weight to 95% by weight in a blend with any of the thermoplastics described above for forming the backing integral with the rail segments and posts.

Many types of elastomers are commercially available, including those from BASF, Florham Park, N.J., under the trade designation "STYROFLEX", from Kraton Polymers, Houston, Tex., under the trade designation "KRATON", from Dow Chemical, Midland, Mich., under the trade designation "PELLETHANE", "INFUSE", VERSIFY", "NORDEL", and "ENGAGE", from DSM, Heerlen, Netherlands, under the trade designation "ARNITEL", from E. I. duPont de Nemours and Company, Wilmington, Del., under the trade designation "HYTREL", from ExxonMobil, Irving, Tex. under the trade designation "VISTAMAXX", and more.

In some embodiments, the slidable fastener 100 of the present disclosure and/or the backing of the fastener includes a layer of a hot melt adhesive. Hot melt adhesives are typically non-tacky at room temperature and use of hot melts can decrease contamination on equipment during the handling of the film and lamination. Suitable hot melt adhesives include those based on ethylene-vinyl acetate copolymers, ethylene-acrylate copolymers, polyolefins, polyamides, polyesters, polyurethanes, styrene block copolymers, polycaprolactone, and polycarbonates and may include a variety of tackifying resins, plasticizers, pigments, fillers, and stabilizers. Examples of suitable hot melt adhesives include those available from 3M Company, St. Paul, Minn., under the trade designation "3M SCOTCH-WELD" hot melt adhesives (e.g., products 3731 B and 3764 PG).

In some embodiments, the tie layer or hot melt adhesive will be thermally activated in a temperature range of 90° C. to 125° C. depending on time and pressure and can be useful for making a secure bond to a substrate. Referring again to FIG. 4B, the tie layer or hot melt adhesive layer 103 can have any useful thickness. In some embodiments, the tie layer or hot melt adhesive layer 103 has a thickness Z5 of up to 0.1 mm, 0.075 mm, 0.05 mm, or 0.025 mm. Typically, the tie layer or hot melt adhesive layer 103 has a thickness of at least 0.005 mm or 0.01 mm. Useful thicknesses Z5 include those in a range from 0.005 mm to 0.1 mm, 0.005 mm to 0.05 mm, and 0.01 mm to 0.025 mm.

Adhesive

The adhesives used in the adhesive articles described herein can include any adhesive having the desired properties. In some embodiments, the adhesive is stretch releasable. As used herein, the term "stretch-releasable" means removable from the surface of an adherend by stretching in the direction of the bond plane to an elongation of greater than 50%. In other embodiments, the adhesive is peelable, in that it can be removed from the adherend by peeling.

In some embodiments, the adhesive is stretch-releasable and releases cleanly from the surface of an adherend when the adhesive article is stretched at an angle of about 35° or less from a surface of the adherend. In some embodiments, the stretch releasable adhesive releases from a surface of an adherend when the multilayer carrier is stretched at an angle of about 35° or less from the adherend surface such that there are substantially no traces of the adhesive left behind on the surface of the adherend.

In embodiments featuring a peel-releasable (i.e., peelable) adhesive, the article is a single or multilayer construction that can be removed from a substrate or surfaces by stretching it an angle of 35° or greater. In some embodiments, the releasable adhesive may be removed by a combination of stretch and peel-release mechanisms.

In some embodiments featuring either one or both of stretch and peel release adhesives, the adhesive is a pressure sensitive adhesive. A general description of useful pressure sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Any suitable composition, material or ingredient can be used in the pressure sensitive adhesive. Exemplary pressure sensitive adhesives utilize one or more thermoplastic elastomers, e.g., in combination with one or more tackifying resins. In some embodiments, the adhesive is not a pressure sensitive adhesive.

Some exemplary stretch releasable adhesives that can be used in the adhesive articles described herein include, for example, those described in U.S. Pat. No. 6,569,521 (Bries et al.) or International Publications WO/2017/136188 (Runge et al.), WO/2017/136219 (Antony et al.), or US Publication No. 2016/0068722 (Schmitz Stapela et al.), each of which is incorporated herein in its entirety. In some embodiments, the adhesive layer includes one or more hydrocarbon block copolymers; and a polar phenolic tackifier comprising a phenolic moiety and having a hydroxyl value of between 20 to 130 and an acid value of less than 0.5. In some embodiments, the adhesive includes at least one of the polar phenolic tackifiers is a terpene phenol.

Some stretch releasable adhesives that can be used in the adhesive articles of the present disclosure have a glass transition temperature of about −125° C. to 20° C., as determined by dynamic mechanical analysis of the tan δ peak value. Some stretch releasable adhesives that can be used in the adhesive articles of the present disclosure have a storage modulus of about 400,000 Pa or less, or 300,000 or less at 25° C., as determined by dynamic mechanical analysis.

In some embodiments, the thickness of the stretch releasable adhesive on at least one of the first or second major surfaces of the multilayer carrier is about 1 μm to about 1 mm.

In some embodiments, the stretch releasable adhesives are tailored to achieve removal with no or minimal damage. Exemplary methods and articles for doing so are described in, for example, U.S. Pat. No. 6,835,452 (Hamerski) and International Publication No. WO/2018/039584 (Runge et al.), each incorporated herein in its entirety.

In embodiments featuring peelable adhesive layers, the peelable adhesive can be, for example, any of the adhesives described in any of the following patent applications, all of which are incorporated by reference herein: International Publication Nos. WO/2015/195616 (Forney et al.), WO/2017/136279 (Cowman-Eggert et al.), WO/2017/136219 (Antony et al.), WO/2017/136188 (Runge et al.), all of which are incorporated herein in their entirety.

In some embodiments, the peelable adhesive layer can include at least one of rubber, silicone, or acrylic based adhesives. In some embodiments, the peelable adhesive can include tackified rubber adhesives, such as natural rubber; olefins; silicones, such as silicone polyureas or silicone block copolymers; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques; polyurethanes; silicone block copolymers; and combinations of the above.

Generally, any known additives useful in the formulation of adhesives, stretch releasable or peelable, may also be included. Additives include plasticizers, anti-aging agents, ultraviolet stabilizers, colorants, thermal stabilizers, anti-infective agents, fillers, crosslinkers, as well as mixtures and combinations thereof. In certain embodiments, the adhesive can be reinforced with fibers or a fiber scrim which may include inorganic and/or organic fibers. Suitable fiber scrims may include woven-, non-woven or knit webs or scrims. For example, the fibers in the scrim may include wire, ceramic fiber, glass fiber (for example, fiberglass), and organic fibers (for example, natural and/or synthetic organic fibers).

In some embodiments, the adhesive includes a tackifier. Some exemplary tackifiers include at least one of polyterpene, terpene phenol, rosin esters, and/or rosin acids.

In some embodiments, the peelable adhesive is a flowable adhesive that can be coated onto the backing. In some embodiments, the peelable adhesive is a more solid adhesive as is generally described in, for example, German Patent No. 33 31 016.

In some embodiments, the peelable adhesive has a Tg of between about −125 degrees Celsius and about 20 degrees Celsius, as determined by dynamic mechanical analysis of the tan δ peak value. In some embodiments, the peelable adhesive has a Tg of between about −70 degrees Celsius and about 0 degrees Celsius. In some embodiments, the peelable adhesive has a Tg of between about −60 degrees Celsius and about −20 degrees Celsius. In some embodiments, the peelable adhesive has a Tg of greater than −80 degrees Celsius, greater than −70 degrees Celsius, greater than −60 degrees Celsius, greater than −50 degrees Celsius, greater than −40 degrees Celsius, or great than −30 degrees Celsius. In some embodiments, the peelable adhesive has a Tg of less than 20 degrees Celsius, 10 degrees Celsius, 0 degrees Celsius, −10 degrees Celsius, −20 degrees Celsius, or −30 degrees Celsius.

Some peelable adhesives that can be used in the adhesive articles of the present disclosure have a storage modulus of about 300,000 Pa or greater, about 400,000 Pa or greater, about 500,000 Pa or greater, about 1,000,000 Pa or greater at 25° C., as determined by dynamic mechanical analysis. In other embodiments, the adhesive has a storage modulus of 750,000 Pa or less, 500,000 Pa or less, 400,000 Pa or less, 300,000 Pa or less, or 250,000 Pa or less at 25° C., as determined by dynamic mechanical analysis.

In some embodiments, the thickness of the peelable adhesive on at least one of the first or second major surfaces of the core is about 1 μm to about 1 mm.

In some embodiments, adhesion properties of the adhesive can range from 0.1 N/dm to 25 N/dm. In some embodiments, adhesion properties of the adhesive can range from 0.5 N/dm to 10 N/dm. In some embodiments, adhesion properties of the adhesive can range from 1 N/dm to 5 N/dm.

In some embodiments, the peelable adhesive can provide a shear strength of, for example, 1-20 pounds per square inch as measured by ASTM Test Method D3654M-06.

In some embodiments, the peelable adhesives are tailored to achieve peel with no or minimal damage. Exemplary methods and articles for doing so are described in, for example, U.S. Pat. No. 6,835,452, International Publication Nos. WO/2018/039584 and WO/2017/136188 referenced above.

Hardgoods

Some embodiments further include a hardgood or mounting device. Exemplary hardgoods or mounting devices include, for example, hooks, knobs, clips, and loops. In some embodiments, the hardgood resembles a nail. In some embodiments, the hardgood has a single outward projection to act as a hanging surface. In some embodiments, the hardgood has multiple outward projections to act as a hanging surface. In some embodiments, the hardgood has is molded into a shape that can hold one or more items within such as but not limited to a box or caddy. In some embodiments, the hardgood is a shelf, ledge, or rack. In some embodiments, the hardgood is a bar wherein the bar can be straight or curved or substantially a ring wherein the bar can be mounted parallel or normal to the substrate surface. In some embodiments, the hardgood uses multiple methods for mounting or hanging items. Any of the following mounting devices can be used with the adhesive article of the present disclosure: Application Matter No. 77486US002 (assigned to the present assignee), U.S. Pat. No. 5,409,189 (Luhmann), U.S. Pat. No. 5,989,708 (Kreckel), 8,708,305 (McGreevy), U.S. Pat. No. 5,507,464 (Hamerski et al.), U.S. Pat. No. 5,967,474 (doCanto et al.), U.S. Pat. No. 6,082,686 (Schumann), U.S. Pat. No. 6,131,864 (Schumann), U.S. Pat. No. 6,811,126 (Johansson, et al.), U.S. Pat. No. D665,653, and U.S. Pat. No. 7,028,958 (Pitzen, et al.), all of which are incorporated by reference in their entirety herein. The hardgood may be any object to be mounted to a substrate.

In some embodiments, the hardgood is mounted to the substrate in one or more places wherein one or more of the mounting locations contain an adhesive article described herein. In some embodiments, the hardgood is mounted using a combination of removable article(s) and conventional mechanical fasteners including but not limited to nails, screws, bolts, and rivets.

In some embodiments, the hardgood is made from of thermoplastic polymers. In some embodiments, the hardgood is made from thermoset polymers. In some embodiments, the hardgood is made using polyolefin materials. In some embodiments, the hardgood is made using polycarbonate materials. In some embodiments, the hardgood is made using high-impact polystyrene. In some embodiments, the hardgood is made using acrylonitrile-butadiene-styrene (ABS) terpolymers. In some embodiments, the hardgood is made using two or more polymeric materials. In some embodiments, the hardgood is made from metal. In some embodiments, the hardgood is made from stainless steel. In some embodiments, the metal is painted, glazed, stained, brushed, or coated to alter its appearance. In some embodiments the hardgood is made from ceramic. In some embodiments, the hardgood is made from glazed ceramic. In some embodiments, the hardgood is made from unglazed ceramic. In some embodiments, the hardgood is comprised of naturally-based materials such as wood, bamboo, particle board, cloth, canvas, or derived from biological sources, and the like. In some embodiments, the naturally-based materials may be painted, glazed, stained, or coated to change their appearance. In some embodiments, the hardgood is made using two or more materials from the list above. In some embodiments, the hardgood is made from two pieces that are reversibly or irreversibly attached, joined, or welded together.

In some embodiments, the hardgood comprises two pieces wherein the first piece acts as a mounting surface for attaching the adhesive article to a substrate, and the second piece acts as a hanging member which may be used for hanging or mounting objects to the substrate. The two pieces may be reversibly attached using mechanical fasteners, hook and loop materials, or an additional adhesive layer.

The hardgood can be made using any method known in the art. In some embodiments, a backing and/or the stretch releasable adhesive layer(s) may be attached manually by the end user.

Methods of Making

The adhesive article described herein can be made in various ways. In some embodiments, the adhesive can be directly coated onto a major surface of the backing. In other embodiments, the adhesive can be formed as a separate layer (e.g., coated onto a release liner) and then laminated to the backing.

The adhesive can be prepared using a variety of common methods for preparing adhesives. For example, the adhesive composition can be coated onto a release liner, coated directly onto a backing, or formed as a separate layer (e.g., coated onto a release liner) and then laminated to a backing. In some embodiments, the adhesive can be formed simultaneously with the backing. For example, a multilayer film consisting of at least two layers, at least one of which is an adhesive, can be coextruded. In some embodiments, the construction can be formed in a cast or blown film construction.

To improve adhesion of the adhesive composition to the construction backing, the backing can be pretreated prior to applying, e.g., coating or laminating, the adhesive composition on the backing. Examples of suitable treatments include corona discharge, plasma discharge, flame treatment, electron beam irradiation, ultraviolet (UV) radiation, acid etching, chemical priming and combinations thereof. The treatment can optionally be performed with a reactive chemical adhesion promoter including, e.g., hydroxyethylacrylate, or hydroxyethyl methacrylate, or another reactive species of low molecular weight.

In the slidable fastener according to the present disclosure, the rail segments, posts, and at least a portion of the backing are integral (that is, generally formed at the same time as a unit, unitary). Fastening elements such as rail segments and upstanding posts on a backing can be made, for example, by feeding a thermoplastic material onto a continuously moving mold surface with cavities having the inverse shape of the fastening elements. The thermoplastic material can be passed between a nip formed by two rolls or a nip between a die face and roll surface, with at least one of the rolls having the cavities. Pressure provided by the nip forces the resin into the cavities. In some embodiments, a vacuum can be used to evacuate the cavities for easier filling of the cavities. The nip has a large enough gap such that a coherent backing is formed over the cavities. The backing may be formed with no holes therethrough. The mold surface and cavities can optionally be air or water cooled before stripping the integrally formed backing and fastening elements from the mold surface such as by a stripper roll.

Suitable mold surfaces for forming fastening elements on a backing include tool rolls such as those formed from a series of plates defining a plurality of cavities about its periphery including those described, for example, in U.S. Pat. No. 4,775,310 (Fischer). Cavities may be formed in the plates by drilling or photoresist technology, for example. Other suitable tool rolls may include wire-wrapped rolls, which are disclosed along with their method of manufacturing, for example, in U.S. Pat. No. 6,190,594 (Gorman et al.). Another example of a method for forming a backing with upstanding fastening elements includes using a flexible mold belt defining an array of fastening element-shaped cavities as described in U.S. Pat. No. 7,214,334 (Jens et al.). Yet other useful methods for forming a backing with upstanding fastening elements can be found in U.S. Pat. No. 6,287,665 (Hammer), 7,198,743 (Tuma), and 6,627,133 (Tuma).

If rail segments formed upon exiting the cavities do not have caps, first and second fastener members will not have any closure affinity for each other. Caps can be subsequently formed on the rail segments by a capping method as described in U.S. Pat. No. 5,077,870 (Melbye et al.). Typically, the capping method includes deforming the tip portions of the rail segments using heat and/or pressure. The heat and pressure, if both are used, could be applied sequentially or simultaneously. The formation of rail segments can also include a step in which the shape of the cap is changed, for example, as described in U.S. Pat. No. 6,132,660 (Kampfer) and/or 6,592,800 (Levitt). For example, one or more of these processes can be useful for changing the shape of the cap portion 8 shown in FIG. 4A to the shape shown in FIG. 5A. The formation of rail segments can also include a step in which the cap is embossed, for example, as described in U.S. Pat. No. 6,000,106 (Kampfer). After one or more of these capping processes, first and second fastener members in a fastening system of the present disclosure can be closed together. The amount of force necessary to close and to peel open the first and second fastener members can be adjusted as desired by tailoring the capping process.

Another useful method for fastening elements on a backing is profile extrusion described, for example, in U.S. Pat. No. 4,894,060 (Nestegard). Typically, in this method a thermoplastic flow stream is passed through a patterned die lip (e.g., cut by electron discharge machining) to form a web having downweb ridges, slicing the ridges, and stretching the web to form separated fastening elements. The ridges may be considered precursors to the fastening elements and exhibit the cross-sectional shape of the rail segments and posts to be formed. The ridges are transversely sliced at spaced locations along the extension of the ridges to form discrete portions of the ridges having lengths in the direction of the ridges essentially corresponding to the length of the fastening elements to be formed. Stretching the backing so that it plastically deforms results in the separation of the fastening elements.

Methods of Using the Adhesive Articles Described Herein

The adhesive articles of the present disclosure can be used in various ways. In some embodiments, the adhesive article is applied, attached to, or pressed into an adherend. In this way, the adhesive article contacts the adherend. Where a release liner is present, the release liner is removed before the adhesive article is applied, attached to, or pressed into an adherend. In some embodiments, at least a portion of the adherend is wiped with alcohol before the adhesive article is applied, attached to, or pressed into an adherend.

Figure 12A:
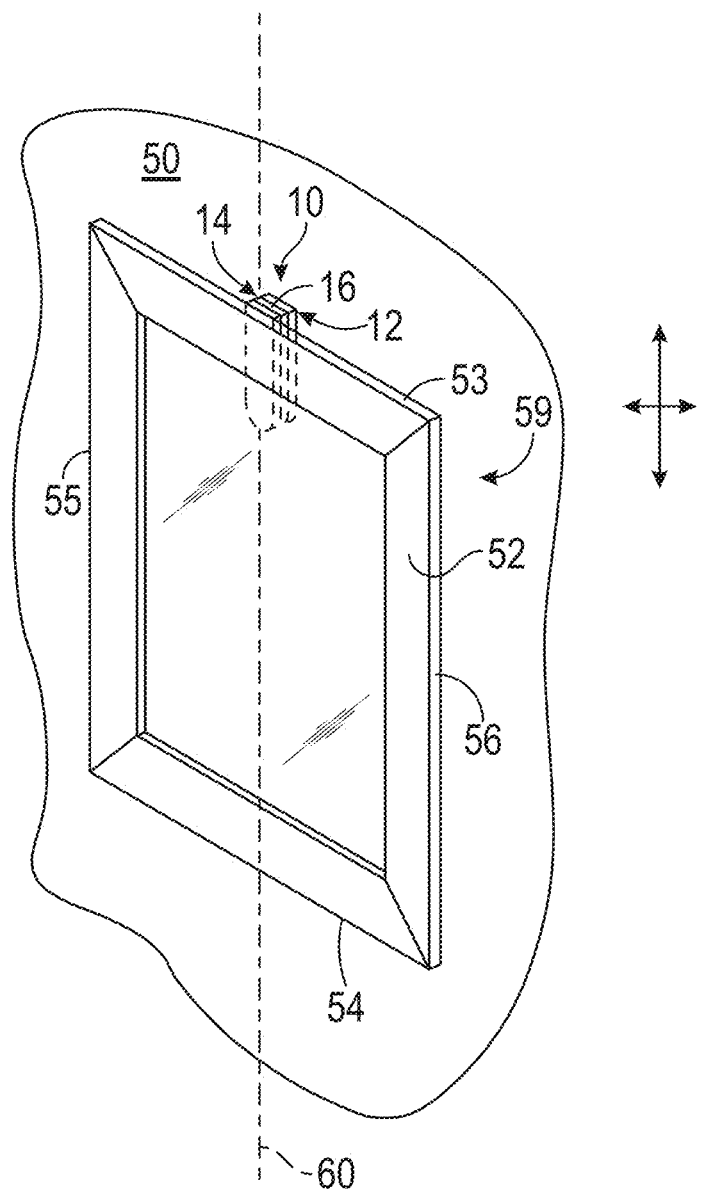
FIG. 12A is a perspective view illustrating an object attached to a wall by the adhesive article of FIG. 1.
Figure 12B:
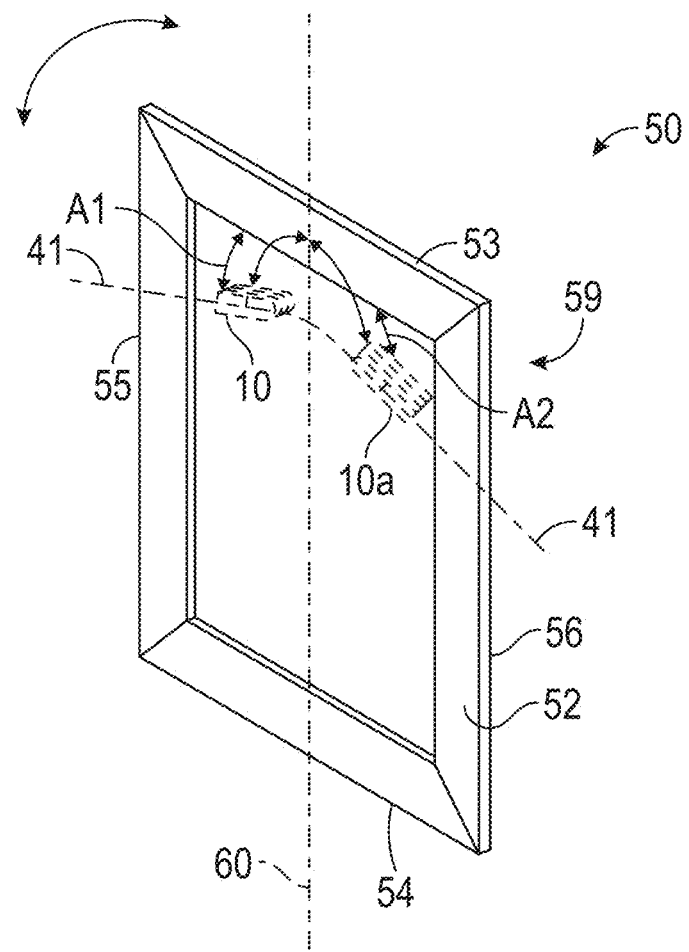
FIG. 12B is another perspective view illustrating an object attached to a wall by the adhesive article of FIG. 1.

Advantageously, the placement of adhesive articles of the present disclosure on an adherend and/or mounting object can control the direction and amount of fine adjustment possible. FIGS. 12A-12B depict different placements of adhesive articles relative to the body of a frame. Turning to FIG. 12A, a frame assembly 50 is depicted having a generally rectangular shape. The frame assembly 50 includes a frame body 52 having a top edge 53, bottom edge 54, and opposing, parallel side edges 55, 56. A central axis 60 essentially bisects the frame body 52. A slidable adhesive article 10 of the present disclosure is adhered to a back surface 59 of the frame body 52, with the first adhesive construction 12 attached to the frame body 52 and the second adhesive construction 14 available to secure the frame 52 to a wall surface. A separable connection system 16 includes first and second connector components each featuring a series of at least rail segments of the type described herein (not shown) that extend generally parallel to the side edges 55, 56, due to the relative orientation of the adhesive constructions 12, 14 on the back surface 64. Once the second construction 14 is adhered to a wall surface and separable components engaged, the frame body 52 is moveable longitudinally (relative to the top edge) and potentially laterally, thanks to slidable connection between the connector components.

The amount of movement permissible laterally vs. longitudinally by the adhesive article 10 is dictated by the comparative length and width dimensions of the separable connector components. In the frame assembly arrangement depicted in FIG. 12A, the longer path of travel will be lateral or horizontal, since the longitudinal axis 41 of the adhesive article 10 is oriented parallel to the top edge 53.

FIG. 12B, in contrast to the orientation of the adhesive article in FIG. 12A, depicts a frame body 52 with a pair of adhesive articles 10, 10a arranged on the back surface 59 with at least one direction of linear movement arranged at an angle relative to the central axis 60. The first adhesive article 10 is arranged adjacent the side edge 55 on one side of the central axis 60, while the second adhesive article 10a is arranged adjacent the opposing side edge 56 on the other side of the axis 60. The first adhesive article 10 is placed on the back surface 59 such that its longitudinal axis 41 forms an angle A1 with the top edge 55. Similarly, the second adhesive article 10a is placed such that its longitudinal axis 41a forms an angle A2 with the top edge. As depicted in FIG. 12B, angles A1 and A2 are obtuse, but the adhesive articles 10 and 10a may each be arranged at any desired angle relative to the top edge.

The orientation of the adhesive articles 10, 10a creates a motion that is primarily a rotation about a point C that lies on the centerline 60. To adjust the position of the frame body 52 when the frame assembly is adhered to a wall surface and the separable connection system 16 is engaged, the user may apply minimal to light pressure at the frame edges opposing the adhesive articles 10, 10a. The user may rotate the position of frame by a desired small amount, by causing the slidable separable connection system 16, 16a in each of the respective adhesive articles to move along a portion of a linear path in a plane that is generally parallel to the wall surface. The gap in the secondary axis of the slidable separable connection system 16, 16a will allow the rotation to occur. While achieving the desired rotation, the frame assembly will also experience some small translation. For instance, if the user causes the separable connector component 38 on the first adhesive construction 10 to slide in the direction of the top edge 53 and central axis 60 to affect generally clockwise rotation, the separable connector component 38a on the second adhesive construction 10a will slide in the direction away from the top edge 53 and central axis 60. This clockwise rotational adjustment of the frame assembly will also create a slight motion to the right of the frame assembly that is a function of the geometry as discussed later. Generally counterclockwise movement will cause the opposite sliding behavior from the first separable components 38, 38a. In this way, the user is allowed to adjust the orientation of the frame body 52 until the user is satisfied with that the top edge 53 is level or otherwise aesthetically desirable. Should the frame body 52 shift while mounted, the user can easily correct the orientation.

FIG. 13A depicts another arrangement of adhesive articles to permit rotation, with two first adhesive constructions 12, 12a arranged with their longitudinal axis 41, 41a in parallel on a mounting object 80. The rows of fastening elements 150, 160 diverge, and when mated with complementary second constructions on a wall (not shown) will permit rotational movement at a center of rotation above the axes 41, 41a. Similarly, a different rotation path with adhesive construction arranged as shown in FIG. 13B, with the collections of rows 150, 160 of fastening elements on the parallel adhesive constructions 12, 12a converging toward the center of the frame 52. The configuration will permit rotational movement at a center of rotation below the axes 41, 41a when mated with complementary second constructions on a mounting object or hardgood (not shown).

Figure 15:
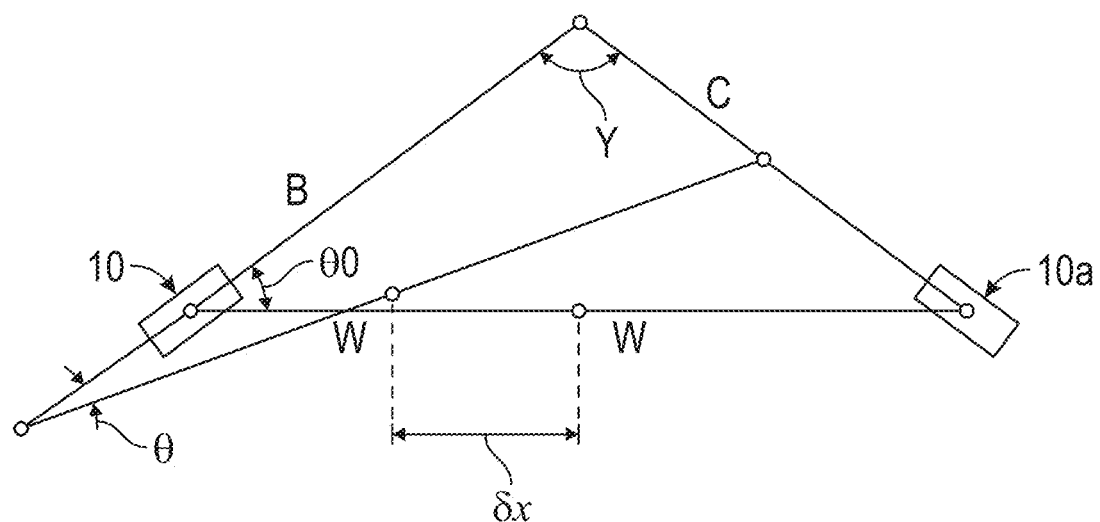
FIG. 15 is a representation of horizontal movement created by rotation of adhesive articles arranged similarly to FIG. 12B and FIG. 13B.

Though the arrangements of adhesive mounting articles in FIGS. 12B, 13A, and 13B are particularly configured for rotation, some horizontal movement of the object may still occur. Such horizontal movement ox will typically be governed by the length L of the fastening elements (e.g., rails or posts) of the adhesive mounting article, the included angle of the opposed rows of fastening elements γ, and the amount of angular rotation θ:

$$\delta x = B\sin\left(\frac{\gamma}{2}\right) - \frac{W}{2}\sin\left(\frac{\gamma}{2} + \theta\right) \quad \text{Equation 3}$$

where B is the length of a side of a triangle formed by of the intersection of axes of motion of the adhesive mounting articles 10, 10a and a line connecting their centers of length W, as shown in FIG. 15. For example, if θ=−3 and γ=75° and L=10 inches, the center of the mounted object would shift horizontally by 0.20 inches.

Figure 16:
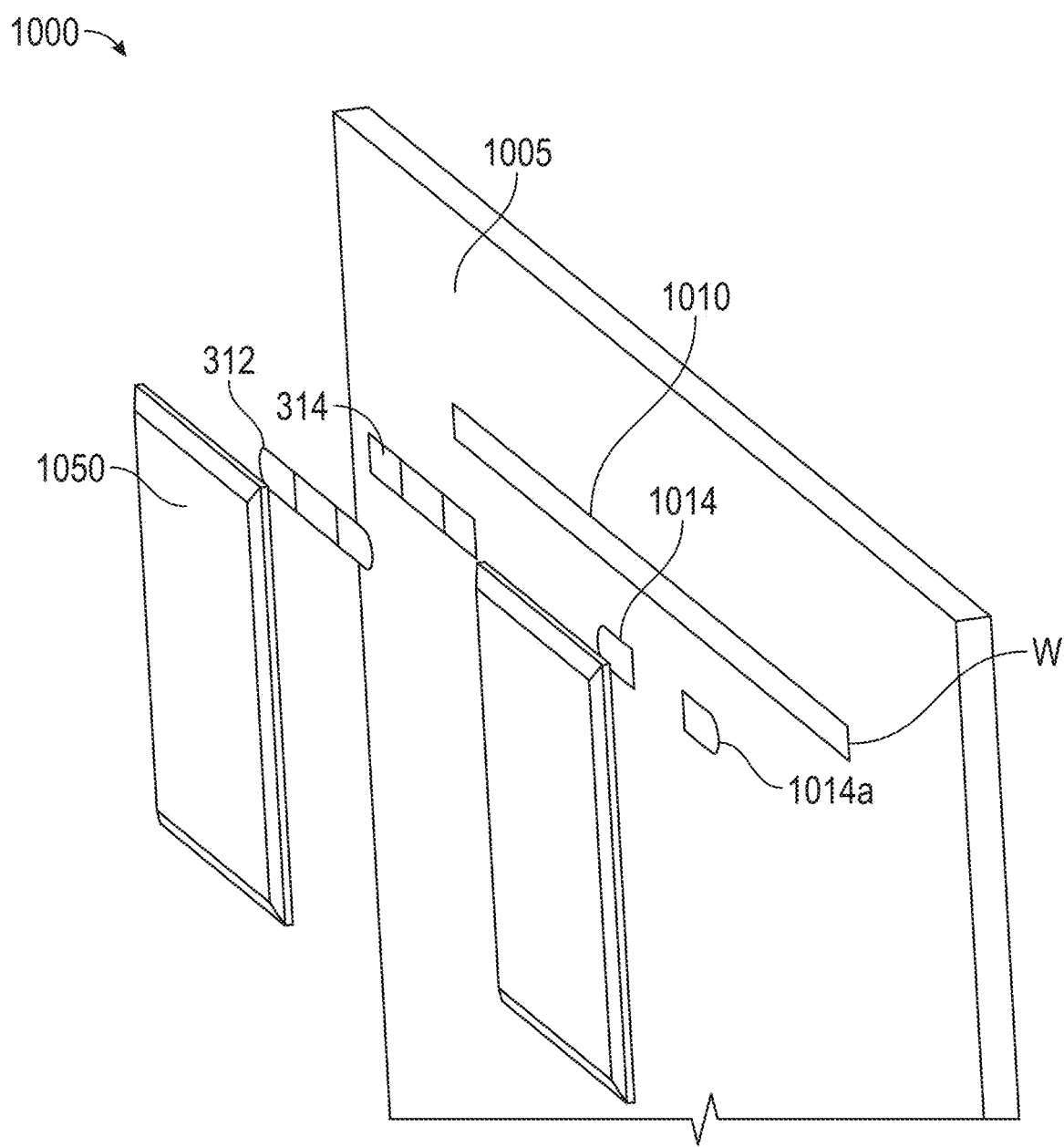
FIG. 16 is an exploded view of an adhesive mounting system according to yet another embodiment of the present disclosure.

The slidable fastening systems and adhesive mounting articles of the present disclosure can also be leveraged to mount and adjust multiple items along a length of surface. One such gallery system is depicted in FIG. 16. The gallery 1000 includes a lateral placement strip 1010 secured to a wall surface 1005 and having rows of rails and/or posts (not depicted) extending across at least a portion of its outer surface 1011. The rows may extend the bulk of the full length of the placement strip 1010 or may be collected at discrete locations and spaced apart along the length of the strip 1010. Mounting objects 1050 can be secured to the placement strip using any of the adhesive constructions and separable connector components described or suggested herein. In one embodiment generally depicted on left most portion of the system in FIG. 16, the gallery system 1000 may operate similar to adhesive article 300 depicted in FIGS. 12A and 12B; the placement strip 1010 can be configured to create a horizontal primary path, and the adhesive construction(s) 312, 314 coupling the mounting object 1050 to strip 1010 configured for primarily rotational and horizontal movement. In addition, or in the alternative, the placement strip 1010 and adhesive constructions 1014,

1014*a* combine to allow movement along only one primary, horizontal path (as shown on the right, bottom of the system 1000 in FIG. 16. Similar considerations hold true if one orients the placement strip 1010 in a primarily vertical direction (i.e., perpendicular to the horizontal orientation shown in FIG. 16).

The lateral placement strip 1010 may be adhesively secured to the wall surface or may be fixed by other mechanical fasteners or separable connection. The lateral placement strip 1010 can also be created with a greater width W than depicted in FIG. 16 to allow for connection of adhesive constructions with separable connector components 1012 at multiple vertical locations along the width W of the strip 1010. Such an arrangement would give the user considerable flexibility in positioning and orienting a desired mounting object.

To remove the adhesive article from the adherend, at least a portion of the adhesive article is peeled or stretched away from the adherend. In some embodiments, the angle of stretch is 35° or less. In other embodiments, the removal angle is 35° or greater. In embodiments where a tab is present, the user can grip the tab and use it to release or remove the adhesive article from the adherend. The separable connection may be disrupted by sliding the separable components along the primary path beyond the length of adhesive construction, thereby disengaging the cooperating features. Alternatively, the user may disengage by pulling an adhesive construction in a direction orthogonal to the bond surface.

The adhesive articles can be used in isolation, as one of many articles attached to a surface, or as part of a stack of adhesive articles. In the latter implementation, the resulting construction would include a plurality of adhesive articles disposed in vertical relation to one another.

Uses

The adhesive articles may be used in wet or high humidity environments such as those found in bathrooms. For example, they can be adhered to toilets (e.g., toilet tanks), bathtubs, sinks, and walls. The adhesive article may be used in showers, locker rooms, steam rooms, pools, hot tubs, and kitchens (e.g., kitchen sinks, dishwashers and back splash areas, refrigerators and coolers). The adhesive article may also be used in low temperatures applications including outdoor applications and refrigerators. Useful outdoor applications include bonding articles such as signage to outdoor surfaces such as windows, doors and vehicles.

The adhesive articles may be used to mount various items and objects to surfaces such as painted drywall, plaster, concrete, glass, ceramic, fiberglass, metal or plastic. Items that can be mounted include, but are not limited to, wall hangings, organizers, holders, baskets, containers, decorations (e.g., holiday decorations), calendars, posters, dispensers, wire clips, body side molding on vehicles, carrying handles, signage applications such as road signs, vehicle markings, transportation markings, and reflective sheeting.

The adhesive articles may be used to mount items and materials, such as anti-slip mats or anti-fatigue mats, to a floor surface or the bottom of a tub or shower, or to secure items, such as area rugs, to a floor. The adhesive article can be used in various joining and assembling applications including such as adhering at least two containers (e.g., boxes) for later separation. The adhesive article can be used in various cushioning and sound deadening applications such as, for example, cushioning materials for placement beneath objects, sound insulating sheet materials, vibration dampening, and combinations thereof. The adhesive article can be used in various closure applications including container closures (e.g., box closures, closures for food containers, and closures for beverage containers), diaper closures, and surgical drape closures. The adhesive article can be used in various thermal insulation applications. The adhesive article can be used in various sealing applications such as in gaskets for liquids, vapors (e.g., moisture), and dust. The adhesive article can be used in various labels such as removable labels (e.g., notes, price tags, and identification labels on containers), and in signage. The adhesive article can be used in various medical applications (e.g., bandages, wound care, and medical device labeling such as in a hospital setting). The adhesive article can be used in various fastening applications such as fastening one object (e.g., a vase or other fragile object) to another object (e.g., a table or a book shelf). The adhesive article can be used in various securing applications such as fastening one or more components of a locking mechanism to a substrate (e.g., a child safety lock can be adhered to a cabinet or cupboard). The adhesive article can be used in various tamper indicating applications (e.g., tamper indicating articles). The adhesive article can also be incorporated in a variety of other constructions including, but not limited to, abrasive articles (e.g., for sanding), articles for sanding and polishing applications (e.g., buffing pads, disc pads, hand pads, and polishing pads), pavement marking articles, carpeting (e.g., backing for carpeting), and electronic devices (e.g., securing a battery within a housing in a cell phone or PDA (personal digital assistant) to prevent unwanted movement).

The adhesive article (i.e., those in adhesive tapes or single article) can be provided in any useful form including, e.g., tape, strip, sheet (e.g., perforated sheet), label, roll, web, disc, and kit (e.g., an object for mounting and the adhesive tape used to mount the object). Likewise, multiple adhesive articles can be provided in any suitable form including, e.g., tape, strip, sheet (e.g., perforated sheet), label, roll, web, disc, kit, stack, tablet, and combinations thereof in any suitable package including, for example, dispenser, bag, box, and carton.

The adhesive articles can also be used to affix a substrate, such as an optical lens or cover, to an optical display device, such as a cellular telephone or portable music player (e.g., MP3 players). In such end use applications, it can be desirable that the adhesive article be optically clear.

In some embodiments, the surface to which the adherend is adhered is at least one of drywall, glass, tile, paint, veneer, wood, or other common household surfaces. In some embodiments, the surface is painted. In some embodiments, the surface is painted with a low or no VOC paint.

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

We claim:
1. An adhesive article comprising:
   a first adhesive construction having a first major surface and a second major surface, with the first major surface defining a bond plane;
   a second adhesive construction having a first major surface and a second major surface;
   a slidable, separable connection coupling to the second major surface of the first adhesive construction and the first major surface of the second adhesive construction, such that the separable connection is disposed between the first and second adhesive constructions,
   wherein the slidable, separable connection allows the first adhesive construction to move freely relative to the second adhesive construction along a primary linear path in a plane substantially parallel to the bond plane, with high shear strength in directions other than in the plane substantially parallel to the bond plane.

2. The adhesive article of claim 1, wherein the first adhesive construction may be removed from an adherend without damage when removed at an angle of 35 degrees or less.

3. The adhesive article of claim 1, wherein the first adhesive construction includes a backing and a first adhesive layer disposed on a first major surface of the backing, the second adhesive construction includes a second adhesive layer.

4. The adhesive article of claim 1, wherein the separable connection includes a first separable connector component coupled to the first adhesive layer and a second separable connector component coupled to the second adhesive layer, and wherein the first separable component is moveable relative to the second component.

5. The adhesive article of claim 4, and wherein each of the first and second separable connector components comprise,
   a backing having a length, a width, and a thickness; and
      rows of rail segments and rows of posts protruding perpendicularly from the backing, wherein the rows of rail segments and rows of posts alternate;
         wherein each of the rail segments has a base portion attached to the backing and a cap portion distal from the backing, wherein the cap portion has a cap width that is greater than a width of the base portion, wherein the cap portion overhangs the base portion on opposing sides, wherein the base portion has a length that is greater than the width of the base portion, and wherein each of the posts has a height that is no greater than a height of the rail segments and a length that is different from the length of the rail segments.

6. The adhesive article of claim 5, wherein a number of posts in one of the rows of posts is more than a number of rail segments in one of the rows of rail segments.

7. The adhesive article of claim 5, wherein the posts have a lower bending stiffness than the rail segments.

8. The adhesive article of claim 5, wherein the post has a base attached to the backing and a distal tip, wherein the distal tip has a cross-sectional area that is less than or equal to a cross-sectional area of the base.

9. The adhesive article of claim 5, wherein at least one of the first and second connector components has at least three of the rows of rail segments alternating with at least three of the rows of posts.

10. The adhesive construction of claim 5, wherein first adhesive construction has a length, and wherein the second adhesive construction is moveable over a least half of the length of the first adhesive construction.

11. The adhesive article of claim 4, wherein each of the first and second separable connector components comprise,
    a backing having a length, a width, and a thickness; and
       rows of rail segments protruding perpendicularly from the backing,
    wherein each of the rail segments has a base portion attached to the backing and a cap portion distal from the backing, wherein the cap portion has a cap width that is greater than a width of the base portion, wherein the cap portion overhangs the base portion on opposing sides, and wherein the base portion has a length that is greater than the width of the base portion.

12. The adhesive article of claim 11, wherein a ratio of the length of the base portion to the width of the base portion is at least 1.5:1.

13. The adhesive article of claim 1, wherein the separable connection includes a first separable connector component and a second separable connector component, and wherein the first separable component is moveable relative to the second component.

14. A system for mounting an object, the system comprising a first adhesive article and a second adhesive article,
    wherein each of the first and second adhesive articles include, a first adhesive construction having a first major surface and a second major surface, with the first major surface defining a bond plane; a second adhesive construction having a first major surface and a second major surface; a slidable, separable connector coupling the second major surface of the first adhesive construction and the first major surface of the second adhesive construction, such that the separable connector is disposed between the first and second adhesive constructions, wherein the slidable, separable connection allows the first adhesive construction to move freely relative to the second adhesive construction along a primary linear path in a plane substantially parallel to the bond plane, with high shear strength in directions other than in the plane substantially parallel to the bond plane.

15. The system of claim 14, wherein the first and second adhesive constructions each include a longitudinal axis, and wherein the primary path of each is arranged parallel to the longitudinal axis.

16. The system of claim 14, wherein the first and second adhesive constructions each include a longitudinal axis, and wherein the primary path of each is arranged at an oblique angle relative to the longitudinal axis.

17. The system of claim 16, wherein the primary path of each is arranged at about a 45-degree angle relative to the longitudinal axis.

18. A system for mounting an object, the system comprising a first adhesive construction having a first major surface and a second major surface, with the first major surface defining a bond plane; a second adhesive construction having a first major surface and a second major surface; a slidable, separable connector coupling the second major surface of the first adhesive construction and the first major surface of the second adhesive construction, such that the slidable, separable connector is disposed between the first and second adhesive constructions,
    wherein the slidable, separable connector includes a first collection of fastening elements and a second collection of fastening elements, the collections spaced apart on the second major surface of the first adhesive construction, and wherein the slidable, separable connector further includes a third collection of fastening elements and a fourth collection of fastening elements, the third and fourth collections spaced apart on the first major surface of the second adhesive construction and configured for mating attachment to the first and second collections, wherein the slidable, separable connection allows the first adhesive construction to move freely relative to the second adhesive construction along a primary path in a plane substantially parallel to the bond plane, with high shear strength in directions other than in the plane substantially parallel to the bond plane.

\* \* \* \* \*